US011951472B2

(12) United States Patent
Li et al.

(10) Patent No.: US 11,951,472 B2
(45) Date of Patent: Apr. 9, 2024

(54) SYSTEMS AND METHODS FOR UNDERMEDIA REPELLENCY

(71) Applicant: Wisconsin Alumni Research Foundation, Madison, WI (US)

(72) Inventors: Chao Li, Madison, WI (US); Jiaquan Yu, Madison, WI (US); Theodorus Evan de Groot, Madison, WI (US); David James Beebe, Monona, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 971 days.

(21) Appl. No.: 16/623,194

(22) PCT Filed: Jun. 15, 2018

(86) PCT No.: PCT/US2018/037815

§ 371 (c)(1),
(2) Date: Dec. 16, 2019

(87) PCT Pub. No.: WO2018/232279

PCT Pub. Date: Dec. 20, 2018

(65) Prior Publication Data

US 2021/0138451 A1 May 13, 2021

Related U.S. Application Data

(60) Provisional application No. 62/520,533, filed on Jun. 15, 2017.

(51) Int. Cl.

| | |
|---|---|
| ***B01L 3/00*** | (2006.01) |
| ***B05D 1/00*** | (2006.01) |
| ***B05D 5/08*** | (2006.01) |

(52) U.S. Cl.

CPC ................ *B01L 3/502* (2013.01); *B05D 1/60* (2013.01); *B05D 5/08* (2013.01); *B01L 2300/166* (2013.01)

(58) Field of Classification Search

CPC ..... B01L 3/502; B01L 2300/166; B05D 1/60; B05D 5/08

See application file for complete search history.

(56) References Cited

U.S. PATENT DOCUMENTS 7,582,333 B2 * 9/2009 Hirai ...................... H05K 3/125 427/421.1
8,288,284 B2 * 10/2012 Arita ...................... H01L 24/29 216/49

(Continued)

FOREIGN PATENT DOCUMENTS

WO 2007024190 A1 3/2007
WO WO-2007024190 A1 * 3/2007 ........... B05C 5/0225

OTHER PUBLICATIONS

European Patent Office, Extended Search Report, Application No. 18818837.9, dated Jul. 13, 2021, 14 pages.

(Continued)

*Primary Examiner* — Dah-Wei D. Yuan
*Assistant Examiner* — Kristen A Dagenais
(74) *Attorney, Agent, or Firm* — Quarles & Brady, LLP

(57) ABSTRACT

Systems, methods, compositions of matter, and kits for undermedia repellency are disclosed. In some cases, these involve a first volume of a first liquid presented in a second volume of a second liquid above a first location of a first surface. The first liquid, second liquid, and first location can have properties sufficient to give rise to undermedia perfect liquid repellency.

11 Claims, 14 Drawing Sheets

(56) References Cited

U.S. PATENT DOCUMENTS

| | | | | |
|---|---|---|---|---|
| 8,613,217 | B2 * | 12/2013 | Colin | G01N 13/02<br>73/64.48 |
| 9,180,453 | B2 * | 11/2015 | Chiu | G01N 35/10 |
| 2009/0217742 | A1 * | 9/2009 | Chiu | B01L 3/502753<br>250/288 |
| 2010/0120130 | A1 | 5/2010 | Srinivasan et al. | |
| 2015/0209198 | A1 * | 7/2015 | Aizenberg | C09D 5/1693<br>428/137 |

OTHER PUBLICATIONS

Barthlott, W. et al. "Purity of the sacred lotus, or escape from contamination in biological surfaces." Planta 202.1 (1997): 1-8.

Bhushan, B. Biomimetics: lessons from nature-an overview. Philosophical Transaction of the Royal Society A: Mathematical, Physical, and Engineering Science 367 (2009): 1445-1486.

Bohn, H. F. et al. Insect aquaplaning: Nepenthes pitcher plants capture prey with the peristome, a fully wettable water-lubricated anisotropic surface. Proc. Natl Acad. Sci. USA 101, 14138-14143 (2004).

Cassie, A. B. D. et al. Wettability of porous surfaces. Trans. Faraday Soc. 40, 546-551 (1944).

CLEARCO Product Information. PSF-5cSt Pure Silicone Fluid. (www.clearcoproducts.com). 2017. Accessed version as of Jul. 10, 2017.

De Ruiter, J., et al. Wettability-independent bouncing on flat surfaces mediated by thin air films. Nat. Phys. 11, 48-53 (2014).

Feng, L, et al. "Super-hydrophobic surfaces: from natural to artificial." Advanced materials 14.24 (2002): 1857-1860.

Forbes, P. Self-cleaning materials. Sci. Am. 299, 88-95 (2008).

Hong, J., et al. "Three-dimensional digital microfluidic manipulation of droplets in oil medium." Scientific reports 5 (2015): 10685.

International Searching Authority, International Search Report and Written Opinion for application PCT/US2018/037815, dated Sep. 17, 2018.

Jones, W.R. Jr. et al. Surface-tension Measurements in Air of Liquid Lubricants to 200 oC by The Differential-maximum-bubble-pressure Technique. NASA TN D-6450 (1971).

Juthani, N. et al. Infused polymers for cell sheet release. Sci. Rep. 6, 26109 (2016).

Kanellopoulos, A. G. et al. Adsorption of Sodium Dodecyl Sulphate at The Silicone Fluid/Water Interface. T. Faraday Soc. 67, 3127-3138 (1971).

Kim, H. et al. Prediction of Interfacial Tension Between Oil Mixtures and Water. J. Colloid Interf. Sci. 241, 509-513 (2001).

Kreder, M. J., et al. "Design of anti-icing surfaces: smooth, textured or slippery?." Nature Reviews Materials 1.1 (2016): 15003.

Lafuma, A. et al. Superhydrophobic states. Nat. Mater. 2, 457-460 (2003).

Leslie, D. C. et al. A bioinspired omniphobic surface coating on medical devices prevents thrombosis and biofouling. Nat. Biotechnol. 32, 1134-1140 (2014).

Liu, T. L. et al. Repellent surfaces. Turning a surface superrepellent even to completely wetting liquids. Science 346, 1096-1100 (2014).

Mazutis, L. et al. Selective Droplet Coalescence Using Microfluidic Systems. Lab Chip 12, 1800-1806 (2012).

Molácek, J. et al. Drops bouncing on a vibrating bath. J. Fluid Mech. 727, 582-611 (2013).

Neinhuis, C., et al. "Characterization and distribution of water-repellent, self-cleaning plant surfaces." Annals of botany 79.6 (1997): 667-677.

Olsen, D. A. et al. The Critical Surface Tension of Glass. J. Phys. Chem. 68, 2730-2732 (1964).

Paxson, A. T., et al. "Stable dropwise condensation for enhancing heat transfer via the initiated chemical vapor deposition (iCVD) of grafted polymer films." Advanced Materials 26.3 (2014): 418-423.

Shi, W., et al. "Cell micropatterns based on silicone-oil-modified slippery surfaces." Nanoscale 8.44 (2016): 18612-18615.

Sun, T., et al. "Bioinspired surfaces with special wettability." Accounts of chemical research 38.8 (2005): 644-652.

SURFACE-TENSION.DE (2017) Solid Surface Energy Data (SFE) for Common Polymers & Surface Tension Values of Some Common Test Liquids for Surface Energy Analysis. (www.surface-tension.de).

Tuteja, A. et al. Designing superoleophobic surfaces. Science 318, 1618-1622 (2007).

Wang, L. et al. Covalently Attached Liquids: Instant Omniphobic Surfaces with Unprecedented Repellency. Angew. Chem. Int. Ed Engl. 55, 244-248 (2016).

Wenzel, R. N. Resistance of Solid Surfaces to Wetting By Water. Ind. Eng. Chem. Res. 28, 988-994 (1936).

Wong, T.-S. et al. Bioinspired self-repairing slippery surfaces with pressure-stable omniphobicity. Nature 477, 443-447 (2011).

Young, T. "An essay on the cohesion of fluids." Abstracts of the Papers Printed in the Philosophical Transactions of the Royal Society of London. No. 1. London: The Royal Society, 1832.

Young, T. "An essay on the cohesion of fluids." Philosophical transactions of the royal society of London 95 (1805):65-87.

Zhang, P., et al. "Superwetting surfaces under different media: Effects of surface topography on wettability." Small 11.16 (2015): 1939-1946.

* cited by examiner a

SYSTEMS AND METHODS FOR UNDERMEDIA REPELLENCY

CROSS-REFERENCE TO RELATED APPLICATIONS

This application is a 371 U.S. National Phase patent application of PCT/US2018/037815, filed Jun. 15, 2018, which claims priority to U.S. Provisional Application No.: 62/520,533 filed Jun. 15, 2017, each of which is incorporated by reference in its entirety for all purposes.

STATEMENT REGARDING FEDERALLY SPONSORED RESEARCH

This invention was made with government support under CA181648 and CA185251 awarded by the National Institutes of Health. The government has certain rights in the invention

BACKGROUND

Systems in nature can provide physical systems with phenomenal liquid repellency properties. For example, the lotus leaf, when contacted by a droplet of water, strongly repels the water, forming a droplet with a contact angle (CA) greater than 150°. Another example, the pitcher plant, which surface is infused by secreted oil, easily makes a droplet of water slide off.

In spite of the efforts to date to attempt to replicate these effects with man-made materials, predictable perfect liquid repellency with 180° CA has never been observed. The compromise from perfect liquid repellency can lead to failures in many fields of real-life applications, e.g. underwater lifetime dry surface, anti-icing, and anti-biofouling.

It would be useful to develop methods and non-natural, man-made systems that are capable of predicting and forming perfect liquid repellency, i.e. liquid gets completely repelled by a solid surface in lifetime.

BRIEF SUMMARY

In one aspect, the present disclosure provides a method of making a droplet of a first liquid exhibiting perfect liquid repellency in a second volume of a second liquid covering a first solid surface. The method includes: a) introducing a first volume of a first liquid into a second volume of a second liquid above a first location on a first solid surface. The first liquid and the second liquid have a known first liquid-second liquid interfacial tension. The first liquid and the first location on the first solid surface have a known first liquid-first location interfacial tension. The second liquid and the first location on the first solid surface have a known second liquid-first location interfacial tension. The first liquid-first location interfacial tension is greater than or equal to the sum of the first liquid-second liquid interfacial tension and the second liquid-first location interfacial tension, thereby giving rise to perfect liquid repellency between the first liquid and the first location on the first solid surface.

In another aspect, the present disclosure provides a method of making multiple droplets of a first liquid exhibiting perfect liquid repellency in a second volume of a second liquid covering a first solid surface. The method includes: a) introducing a first volume of the first liquid into the second volume of the second liquid above a first location on a first solid surface; and b) introducing a third volume of the first liquid into the second volume of the second liquid above a second location on the first solid surface. The first liquid and the second liquid have a known first liquid-second liquid interfacial tension. The first liquid and the first location on the first solid surface have a known first liquid-first location interfacial tension. The second liquid and the first location on the first solid surface have a known second liquid-first location interfacial tension. The first liquid-first location interfacial tension is greater than or equal to the sum of the first liquid-second liquid interfacial tension and the second liquid-first location interfacial tension, thereby giving rise to perfect liquid repellency between the first liquid and the first location on the first solid surface. The first liquid and the first location on the first solid surface have a known first liquid-first location interfacial tension. The second liquid and the first location on the first solid surface have a known second liquid-first location interfacial tension. The first liquid-first location interfacial tension is greater than or equal to the sum of the first liquid-second liquid interfacial tension and the second liquid-first location interfacial tension, thereby giving rise to perfect liquid repellency between the first volume of the first liquid and the first location on the first solid surface. The first liquid and the second location on the first solid surface have a known first liquid-second location interfacial tension. The second liquid and the second location on the first solid surface have a known second liquid-second location interfacial tension. The first liquid-second location interfacial tension is greater than or equal to the sum of the first liquid-second liquid interfacial tension and the second liquid-second location interfacial tension, thereby giving rise to perfect liquid repellency between the third volume of the first liquid and the second location on the first solid surface.

In yet another aspect, the present disclosure provides a system configured for providing a first droplet of a first liquid submerged under a second liquid and exhibiting perfect liquid repellency from a first solid surface. The system includes a liquid reservoir, the first solid surface, an injector, and one or more of the following: an injector translator, a physical manipulator, a first solid surface translator, an electrostatic manipulator, a magnetic manipulator, an optical tweezers manipulator, an acoustic manipulator, a slope introduction actuator, and a pump. The liquid reservoir is configured to receive the second liquid. The first solid surface is positioned within the liquid reservoir. The first solid surface is configured to receive the first droplet of the first liquid. The injector is configured to deliver the first droplet of the first liquid. The injector translator is coupled to the injector. The injector translator is configured to move the injector relative to the first solid surface. The physical manipulator is configured to contact the first droplet of the first liquid and move the first droplet of the first liquid in response to movement of the physical manipulator. The first solid surface translator is coupled to the first solid surface. The first solid surface translator is configured to move the first solid surface relative to the injector. The electrostatic manipulator is configured to interact electrostatically with the first droplet of the first liquid and induce movement of the first droplet of the first liquid. The magnetic manipulator is configured to interact magnetically with the first droplet of the first liquid and induce movement of the first droplet of the first liquid. The optical tweezers manipulator is configured to project light that functions as an optical tweezers with respect to the first droplet of the first liquid. The acoustic manipulator is configured to emit acoustic waves that interact with the first droplet of the first liquid and induce movement of the first droplet of the first liquid. The slope introduction actuator is coupled to the first solid surface. The slope introduction actuator is configured to introduce a slope to the first solid surface. The pump is configured to control fluid movement of the second liquid within the reservoir.

In yet another aspect, the present disclosure provides a composition of matter. The composition of matter includes a first solid surface, a first volume of a first liquid, and a second volume of a second liquid. The second volume is sufficient to fully encapsulate the first volume. The first liquid and the second liquid have a known first liquid-second liquid interfacial tension. The first liquid and the first solid surface have a known first liquid-solid interfacial tension. The second liquid and the first solid surface have a known second liquid-solid interfacial tension. The first liquid-solid interfacial tension is greater than or equal to the sum of the first liquid-second liquid interfacial tension and the second liquid-solid interfacial tension, thereby giving rise to perfect liquid repellency between the first liquid and the first solid surface.

In yet a further aspect, the present disclosure provides a kit for providing a droplet of a first liquid submerged under a second liquid and exhibiting perfect liquid repellency. The kit includes a substrate having a first solid surface and a liquid identifier. The liquid identifier identifies the first liquid and the second liquid. The first liquid and the second liquid have a known first liquid-second liquid interfacial tension. The first liquid and the first solid surface have a known first liquid-solid interfacial tension. The second liquid and the first solid surface have a known second liquid-solid interfacial tension. The first liquid-solid interfacial tension is greater than or equal to the sum of the first liquid-second liquid interfacial tension and the second liquid-solid interfacial tension, thereby giving rise to perfect liquid repellency between the first liquid and the first solid surface.

In an additional aspect, the present disclosure provides a method of making a patterned solid surface. The method includes patterning a first solid surface to contain a first portion and a second portion. The first portion of the first solid surface initiates perfect liquid repellency in a first volume of a first liquid positioned in a second volume of a second liquid above the first portion of the first solid surface. The second portion of the first solid surface initiates finite liquid repellency in a fourth volume of the first liquid positioned in the second liquid above the second portion of the first solid surface.

DETAILED DESCRIPTION

Figure 1:
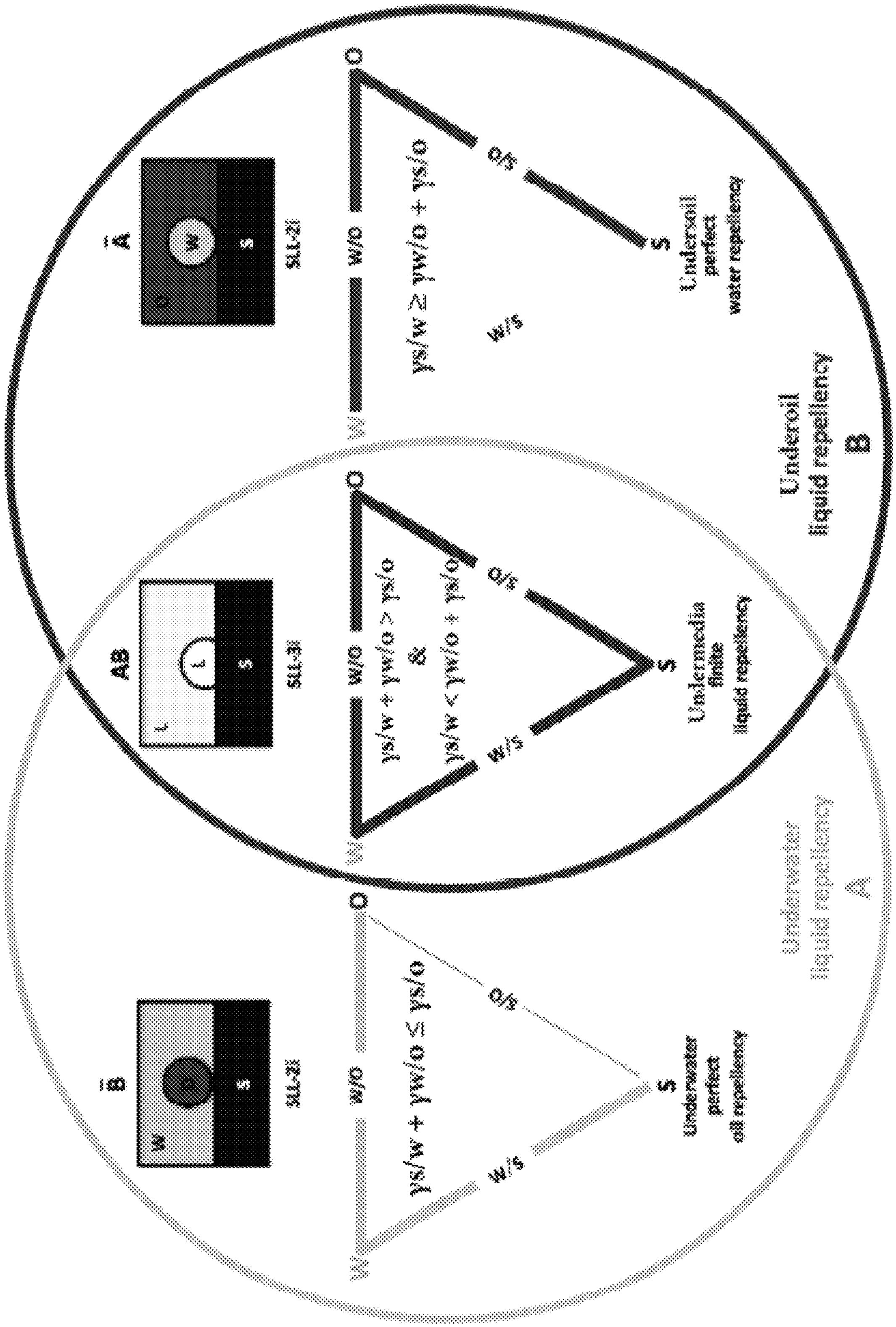
FIG. 1 includes S/W/O triangles and a Venn diagram of undermedia liquid repellency, in accordance with an aspect of the present disclosure.

Before the present invention is described in further detail, it is to be understood that the invention is not limited to the particular embodiments described. It is also to be understood that the terminology used herein is for the purpose of describing particular embodiments only, and is not intended to be limiting. The scope of the present invention will be limited only by the claims. As used herein, the singular forms “a”, “an”, and “the” include plural embodiments unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term “comprising”, “including”, or “having” should be interpreted as referring to elements, components, or steps in a non-exclusive manner, so the referenced elements, components, or steps may be combined with other elements, components, or steps that are not expressly referenced. Embodiments referenced as “comprising”, “including”, or “having” certain elements are also contemplated as “consisting essentially of” and “consisting of” those elements, unless the context clearly dictates otherwise. It should be appreciated that aspects of the disclosure that are described with respect to a system are applicable to the methods, and vice versa, unless the context explicitly dictates otherwise.

Numeric ranges disclosed herein are inclusive of their endpoints. For example, a numeric range of between 1 and 10 includes the values 1 and 10. When a series of numeric ranges are disclosed for a given value, the present disclosure expressly contemplates ranges including all combinations of the upper and lower bounds of those ranges. For example, a numeric range of between 1 and 10 or between 2 and 9 is intended to include the numeric ranges of between 1 and 9 and between 2 and 10.

Aspects of the present disclosure that are described in the context of a method are applicable to the systems, compositions, and kits described herein, unless the context clearly dictates otherwise. Similarly, aspects of the present disclosure that are described in the context of a system are applicable to the methods, compositions, and kits described herein, unless the context clearly dictates otherwise. The same is true for aspects of the present disclosure described in the context of compositions and kits.

As used herein, "immiscible" refers to incapable of being mixed or blended together. Immiscible liquids that are shaken together eventually separate into layers. Oil and water are immiscible.

As used herein, "an aqueous liquid" refers to any liquid is composed of water in major and its solutes and/or dispersed phases.

As used herein, "oil" refers to any liquid immiscible to water and/or an aqueous liquid.

As used herein, "finite liquid repellency" refers to a state of matter whereby a three-phase system including a solid surface, a drop of liquid and a continuous phase (either gas or liquid) give rise to no or partial separation of the drop of liquid by the continuous phase about the solid surface.

As used herein, "undermedia perfect liquid repellency" refers to a state of matter whereby a three-phase system including a solid surface, a dispersed phase of liquid and a continuous phase of liquid give rise to complete repellency of the drop of dispersed liquid by the continuous phase of liquid about the solid surface.

As used herein, "stable perfect liquid repellency" refers to perfect liquid repellency which is thermodynamically favorable without time-dependent decay. In comparison, "transient perfect liquid repellency" refers to perfect liquid repellency which is only dynamically favorable and decays and/or disappears over a length of time of observation.

As used herein, the subscript "S" refers to solid, the subscript "L" refers to liquid, the subscript "G" refers to gas, the subscript "W" refers to water or an aqueous liquid, and the subscript "O" refers to oil or an oil-based solution or suspension.

As used herein, the term "solid surface" refers to a unified surface composed of a solid phase of matter that can have uniform chemical composition or which can have varying chemical composition. Solid surfaces can be substantially flat or can have three-dimensional patterning (such as patterned dimples, patterned channels, or the like). To use an open-topped box as an example, the entire inner surface (i.e., the bottom and four walls) can be considered a solid surface or only the bottom surface can be considered a solid surface. The term is intended to be interpreted broadly. If the chemical composition is different between two areas on a solid surface, that can and will be defined herein.

As used herein, the term "cell" refers to the biological unit and not a small containing area, unless the context clearly dictates otherwise.

As used herein, the term "smooth" solid surface refers to a surface having average surface roughness comparable to or less than atomic scale.

When reference is made herein to a droplet or volume of liquid being "above" a solid surface, it is also expressly contemplated that the droplet or volume of liquid can be below the solid surface. Above refers to a direction relative to the gravitational forces acting on the droplet or volume of liquid. Specifically, if the droplet or volume of liquid (i.e., the dispersed phase of liquid) has a significantly lower density than the continuous phase of liquid (i.e., if the droplet or volume floats in the continuous phase of liquid), then the gravitational forces acting on the droplet or volume of liquid are pointed downward, so reference to the droplet or volume of liquid being "above" the solid surface refers to a downward direction below the surface.

The present disclosure provides systems, methods, compositions of matter, and kits relating to liquid repellency and/or undermedia repellency.

Undermedia Perfect Liquid Repellency

The systems, methods, compositions of matter, and kits described herein involve in one way or another the concept of undermedia perfect liquid repellency. It has been observed that this undermedia perfect liquid repellency is attainable under the right conditions.

To explain this behavior we look to two fundamental concepts in thermodynamics—surface and interface. The terms surface and interface are often used interchangeably, but are different if their thermodynamic boundary conditions are considered (See, FIG. 1). For a surface to stably exist, its surface tension must be greater than zero. Otherwise the atoms constituting a solid or a liquid will quickly diffuse into air. However, for an interface formed by two non-gas phases (e.g. a S/L interface) the S/L interfacial tension can be either positive, negative or zero and is directly determined by the interaction between the two phases. If the S/L interfacial tension is set equal to the sum of the surface tensions of each component phase, the interaction between the two phases is negligible (or zero) compared with the interaction from each bulk. In this case, the two phases are completely separated, which makes the interface between the two phases disappear.

In Young's equation $\gamma_{S/L}=\gamma_{S/G}-\downarrow_{L/G}\cos\theta$ (where $\gamma_{S/G}$ is solid surface tension, $\gamma_{L/G}$ is liquid surface tension, $\gamma_{S/L}$ is S/L interfacial tension, and $\theta$ is the inherent contact angle) and if $\theta$ is set as 180°, then $\gamma_{S/L}=\gamma_{S/G}+\gamma_{L/G}$ can be derived yet is obviously at odds with the thermodynamic boundary condition of S/L interface ($\gamma_{S/L}=\gamma_{S/G}+\gamma_{L/G}$). This is consistent with empirical observations that no solid can perfectly repel liquid in air with long-term stability. Here it's interesting to see that if $\gamma_{S/G}$ is set to $\theta$ and $\gamma_{S/L}=\gamma_{L/G}$, then $\theta=180°$ is achieved. This situation corresponds to a type of widely observed wetting phenomena in nature as bouncing water drops in air or on a thin film of air with a "disappeared" S/L interface.

Rewriting the subscript of each parameter in Young's equation to meet the undermedia condition gives $\gamma_{S/Lcp}=\gamma_{S/Ldp}+\gamma_{Ldp/Lcp}\cos\theta$. Setting $\theta$ to 180° yields $\gamma_{S/Lcp}=\gamma_{S/Ldp}+\gamma_{Ldp/Lcp}$. Next, applying the thermodynamic boundary conditions of surface ($\gamma_{S/G}$, $\gamma_{Lcp/G}$, and $\gamma_{Ldp/G}>0$) and S/L, L/L interfaces ($\gamma_{S/Lcp}<\gamma_{S/G}+\gamma_{Lcp/G}$, $\gamma_{S/Ldp}<\gamma_{S/G}+\gamma_{Ldp/G}$, and $\gamma_{Ldp/Lcp}<\gamma_{Ldp/G}+\gamma_{Lcp/G}$, it is observed that the relationship between $\gamma_{S/Ldp}$ and $\gamma_{S/Lcp}+\gamma_{Ldp/Lcp}$ can be either ">", "=" or "<". In other words, $\gamma_{S/Lcp}+\gamma_{Ldp/Lcp}\leq\gamma_{S/Ldp}$ becomes obtainable in thermodynamics when the gas phase in Young's equation is replaced by a second liquid phase predicting that a solid capable of perfectly repelling liquid in liquid with long-term stability can exist.

Referring to FIG. 1, to illustrate the above discussion, a solid-water-oil (S/W/O) triangle and Venn diagram graphical representation are introduced to map the parameter space of undermedia liquid repellency. The three points of a S/W/O triangle correspond to the three phases of S, W, and O. Each side is formed by connecting any of two points with a solid line, which represents the corresponding interface, i.e. S/W, S/O, and WO. For a given S/W/O triangle, water or oil can be set either as continuous phase or dispersed phase. Then the relationship between $\gamma_{S/Ldp}$ and $\gamma_{S/Lcp}+\gamma_{Ldp/Lcp}$ can be comparably expressed with triangle inequality (i.e. the sum of the lengths of any two sides of a triangle is greater than the length of the third side). For example, if a S/W/O triangle represents a SLL-3i (i.e. undermedia finite liquid repellency with CA<180°, it means all of the three possible interfaces (the S/W, S/O, and W/O sides) are present. In this case, $\gamma_{S/W}+\gamma_{W/O}>\gamma_{S/O}$ (when water is continuous phase) and $\gamma_{S/W}<\gamma_{S/O}+\gamma_{W/O}$ (when oil is continuous phase) obey triangle inequality (center triangle, FIG. 1). In comparison, if $\gamma_{S/W}+$ $\gamma_{W/O} \leq \gamma_{S/O}$ (which disobeys triangle inequality), the S/O interface is thermodynamically unfavorable (left triangle, FIG. 1). This is illustrated as an absent S/O side in a S/W/O triangle. In this case, a SLL-3i degrades to a SLL-2i which corresponds to underwater perfect oil repellency. Similarly, if $\gamma_{S/W} \geq \gamma_{S/O} + \gamma_{W/O}$, the S/W side in a S/W/O triangle or the S/W interface will disappear, which represents underoil perfect water repellency (right triangle, FIG. 1).

The logic discussed above can be further organized in a Venn diagram of undermedia liquid repellency. The universal set (i.e. undermedia liquid repellency) consists of two subsets, subset A for underwater liquid repellency (i.e. water continuous phase) and subset B for underoil liquid repellency (i.e. oil continuous phase). The intersection of A and B (AB) represents undermedia finite liquid repellency (i.e. SLL-3i with CA<180° and normal triangle inequality ($\gamma_{S/W} + \gamma_{W/O} > \gamma_{S/O}$ and $\gamma_{S/W} < \gamma_{S/O} + \gamma_{W/O}$). Undermedia perfect liquid repellency is the complement of AB (AB bar) (i.e. SLL-2i with CA=180° and abnormal triangle inequality ($\gamma_{S/W} + \gamma_{W/O} \leq \gamma_{S/O}$ and $\gamma_{S/W} \geq \gamma_{S/O} + \gamma_{W/O}$). From De Morgan's Law in set theory (AB bar=A bar+B bar), thus, undermedia liquid repellency is also equal to the union of the complement of A (A bar) and the complement B (B bar).

Referring to FIG. 1, S/W/O triangles and a Venn diagram of undermedia liquid repellency are shown. The universal set we wish to consider to describe undermedia liquid repellency consists of two subsets, subset A for underwater liquid repellency and subset B for underoil liquid repellency. The intersection of A and B (AB) represents undermedia finite liquid repellency or SLL-3i with CA<180°. The complement of AB (AB bar) is undermedia perfect liquid repellency or SLL-2i with CA=180°, which is also equal to the union of the complement of A (underoil perfect water repellency, A bar) and the complement of B (underwater perfect oil repellency, B bar).

Interfacial tensions can be measured and/or estimated by methods known to those having ordinary skill in the art.

One example of a suitable method for estimating interfacial tensions between a liquid and a solid is measuring contact angles (θ) in air using a goniometer and estimating the interfacial tensions using Young's equation. From Young's equation $\gamma_{S/G} = \gamma_{S/L} + \gamma_{L/G} \cos\theta$, $\gamma_{S/L} = \gamma_{S/G} - \gamma_{L/g} \cos\theta$ can be easily derived. It is worth noting that the range of value of θ in Young's equation is 0°<θ<180°. When θ is measured as 0°, $\gamma_{S/L}$ calculated as $\gamma_{S/G} - \gamma_{L/G}$ represents the possible maximum value, $\gamma_{S/L\ Max}$. In that case, the true $\gamma_{S/L}$ can be either equal to or smaller than $\gamma_{S/L\ Max}$.

Examples of suitable methods for measuring and/or estimating interfacial tensions between two liquids or between a liquid and a gas are the Capillary Rise Method, the Drop Volume Method or the Stalagmometric Method, the Wilhelmy Plate or Wilhelmy Ring Method, The Ring Method or Tensiometric Method using a Du Noüy Ring Tensiometer, the Maximum Bubble Pressure Method, methods analyzing the shape of pendant or sessile liquid drops or gas bubbles, dynamic methods including analysis of the shape of an oscillating liquid jet, or the like.

Systems

Figure 2:
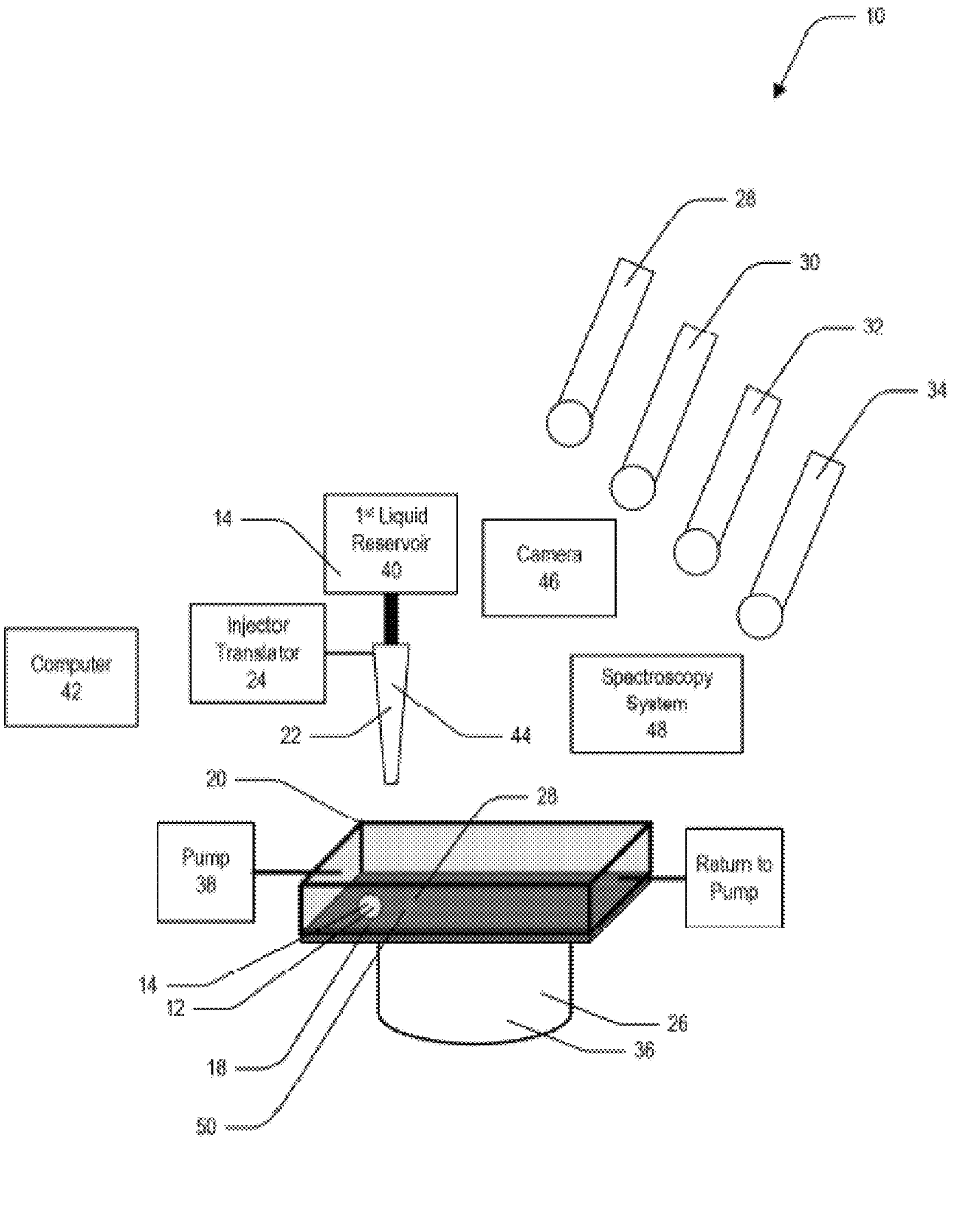
FIG. 2 is a diagram of a system, in accordance with an aspect of the present disclosure.

Referring to FIG. 2, the present disclosure provides a system 10 for providing a first droplet 12 of a first liquid 14 submerged under a second liquid 16 and exhibiting undermedia perfect liquid repellency from a first solid surface 18. The system 10 can include a liquid reservoir 20 configured to receive the second liquid 16. The first solid surface 18 can be positioned within the liquid reservoir 20 and configured to receive the first droplet 12 of the first liquid 14. The system 10 can include an injector 22 configured to deliver the first droplet 12 of the first liquid 14.

The system 10 can include one, two, three, four or more, or all of the following features in all possible combinations. The system 10 can include an injector translator 24. The system 10 can include a first solid surface translator 26. The system 10 can include an electrostatic manipulator 28. The system 10 can include a magnetic manipulator 30. The system 10 can include an optical tweezers manipulator 32. The system 10 can include an acoustic manipulator 34. The system 10 can include a slope introduction actuator 36. The system 10 can include a pump 38. The system 10 can include a first liquid reservoir 40 for retaining the first liquid 14 and for delivering the first liquid via the injector 22. The system 10 can include a physical manipulator 44, which can in some cases be the injector 22 or can be an entity that is separate from the injector (not illustrated).

The system 10 can include a computer 42. The computer 42 can be in electronic communication (not illustrated) with the injector 22, the injector translator 24, the first solid surface translator 26, the electrostatic manipulator 28, the magnetic manipulator 30, the optical tweezers manipulator 32, the acoustic manipulator 34, the slope introduction actuator 36, the pump 38, the first liquid reservoir 40, and/or the physical manipulator 44, or various actuators associated with one or more of these components. The computer 42 can be in wired or wireless communication with the various components.

The system 10 can include an imaging modality, such as one or more cameras 46. The camera(s) 46 can be coupled to the computer 42. The camera(s) can be configured to acquire images of the contents of the reservoir 20, including any droplets 12 that have been deposited therein. Various means of manipulating droplets 12 are discussed elsewhere herein and the camera(s) 46 can be used in concert with the computer 42 (and optionally with the spectroscopic system 48 discussed below) as a feedback mechanism through which to control the movement of droplets 12.

The system 10 can include a spectroscopy system 48 for interrogating the contents of droplets 12. Suitable spectroscopy systems 48 can include, but are not limited to, UV-visible spectroscopy systems, infrared spectroscopy systems, Raman spectroscopy systems, fluorescence spectroscopy systems, circular dichroism spectroscopy systems, reflectance-mode absorption spectroscopy systems, transmission-mode absorption spectroscopy systems, so long as the various liquids, surfaces, reservoirs, and the like are sufficiently transmissive, and the like. The spectroscopy system 48 can be integrated into the reservoir 20 or can be positioned external to the reservoir 20.

The first liquid 14, the second liquid 16, and the chemical composition of at least a portion of the first solid surface 18 can be a combination that achieves perfect liquid repellency as discussed above. The first liquid 14, the second liquid 16, and the chemical composition of the at least a portion of the first solid surface 18 can be those discussed below with respect to the methods and compositions of matter.

In some cases, the first solid surface 18 has a uniform chemical composition that is configured to achieve perfect liquid repellency with a predefined first liquid 14 and second liquid 16.

In some cases, the first solid surface 18 has a first portion having a chemical composition that is configured to achieve perfect liquid repellency with a predefined first liquid 14 and second liquid 16 and a second portion having a chemical composition that is configured to achieve finite liquid repellency with the predefined first liquid 14 and second liquid 16. These solid surfaces can be referred to as "chemically patterned surfaces".

Figure 3:
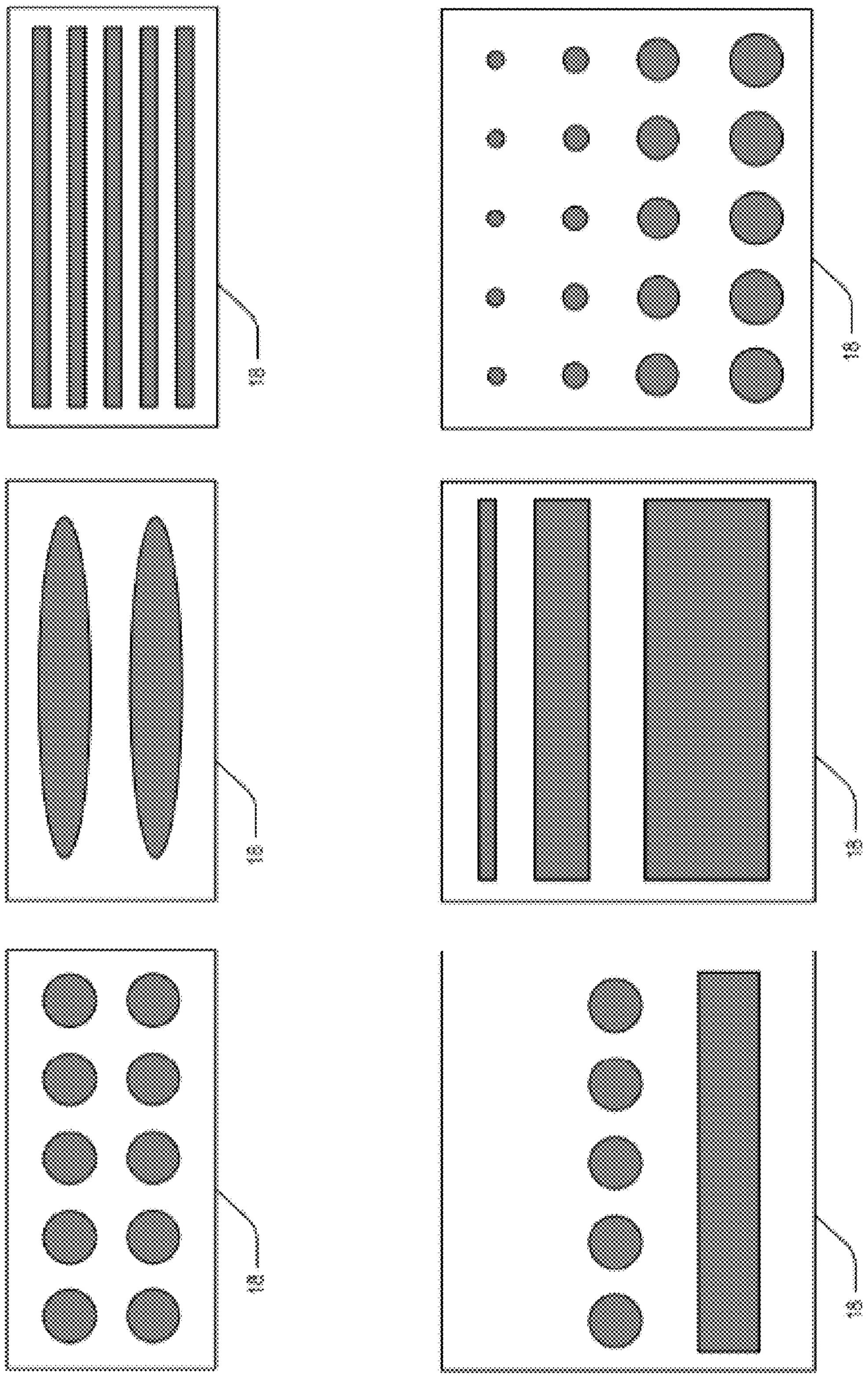
FIG. 3 is an illustration of exemplary chemically patterned surfaces, in accordance with an aspect of the present disclosure.
Figure 4:
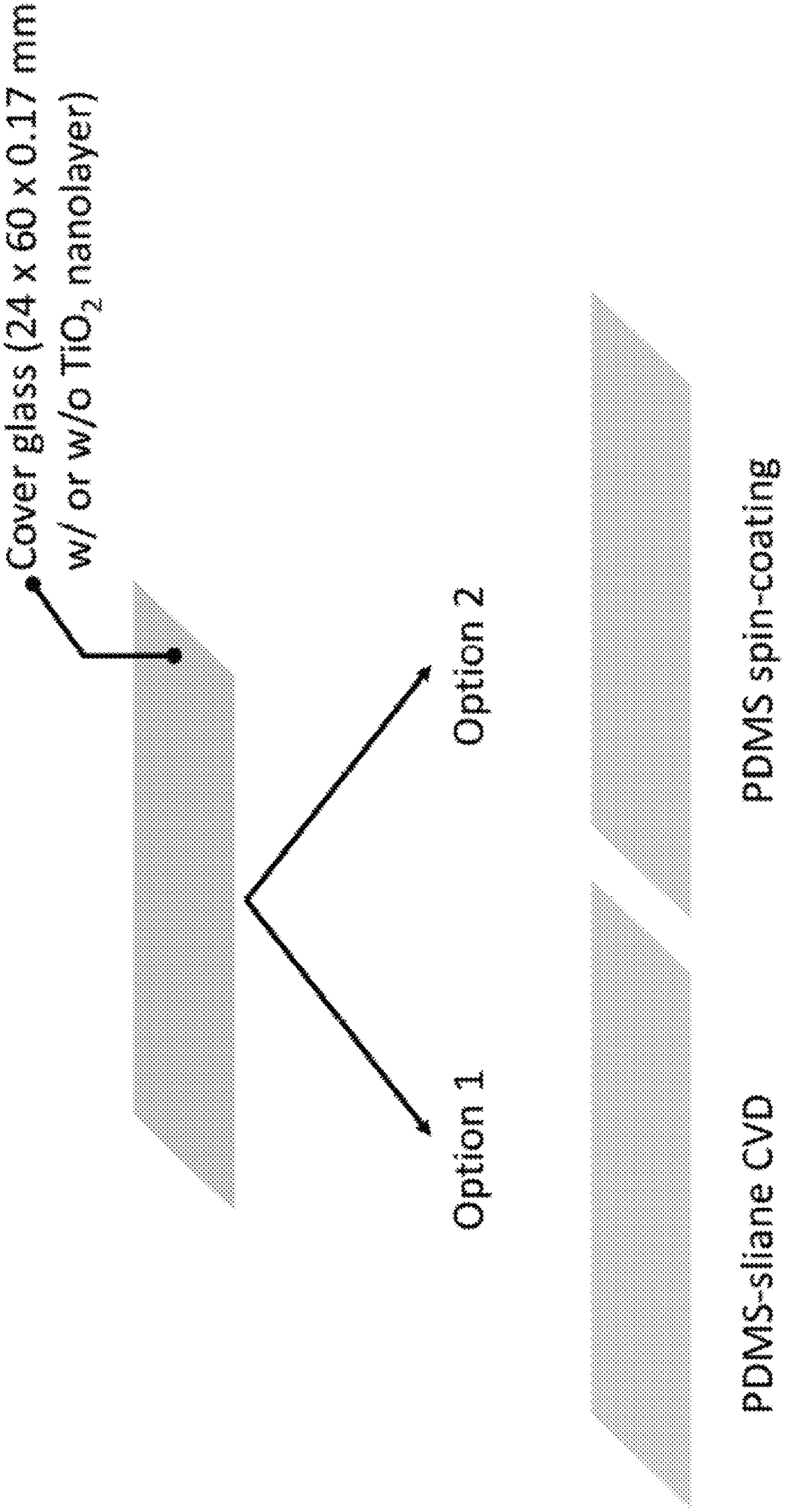
FIG. 4 is an illustration of a portion of a method of patterning a surface, in accordance with an aspect of the present disclosure.
Figure 5:
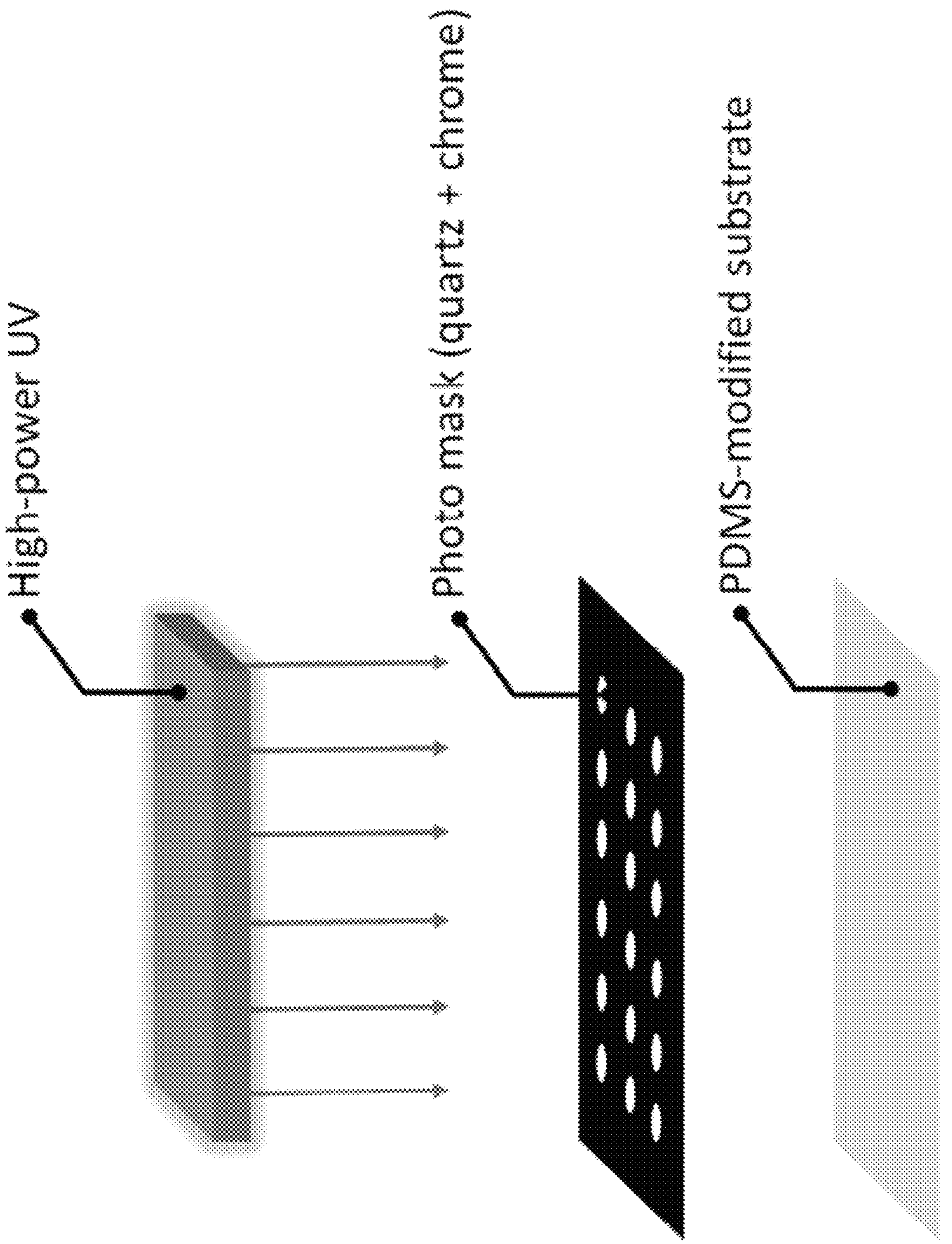
FIG. 5 is an illustration of a portion of a method of patterning a surface, in accordance with an aspect of the present disclosure.
Figure 6:
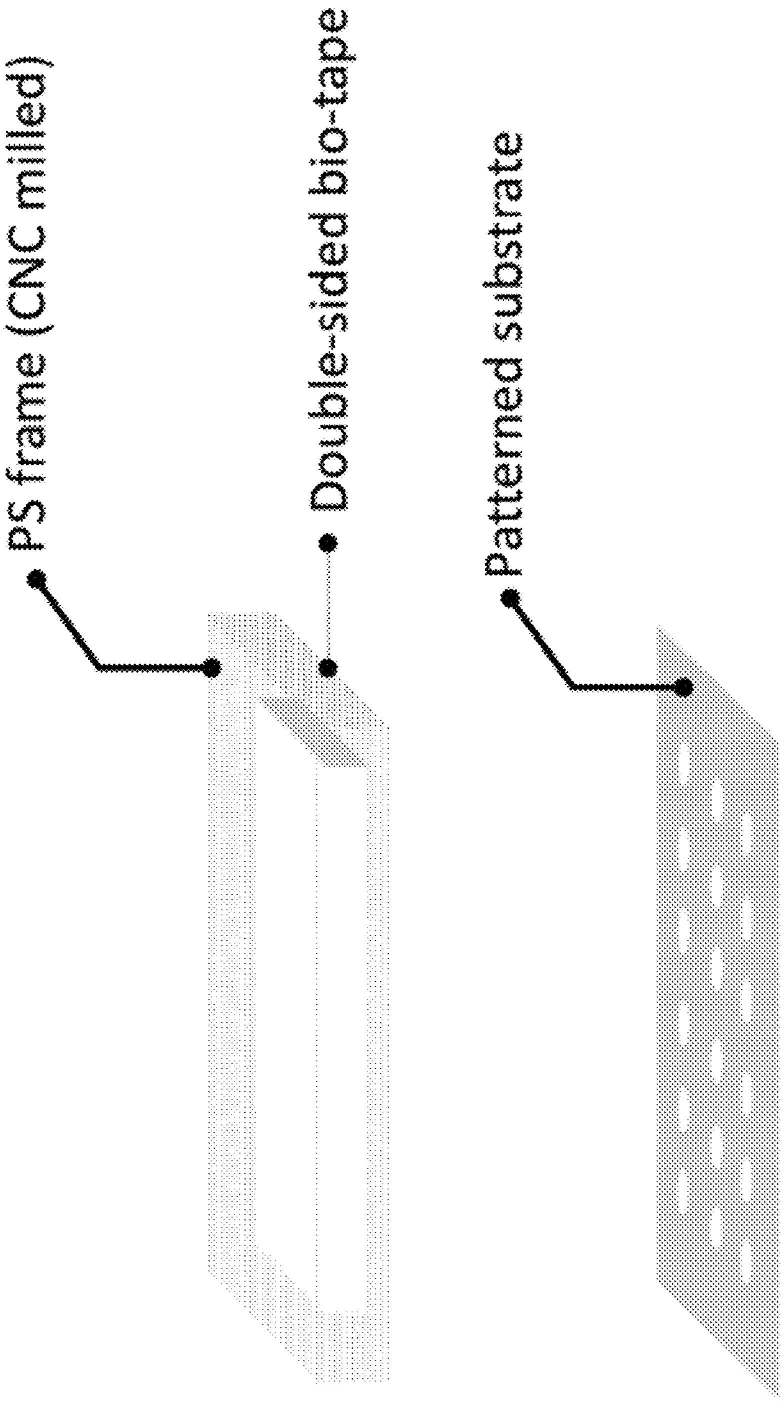
FIG. 6 is an illustration of a portion of a method of patterning a surface, in accordance with an aspect of the present disclosure.
Figure 7:
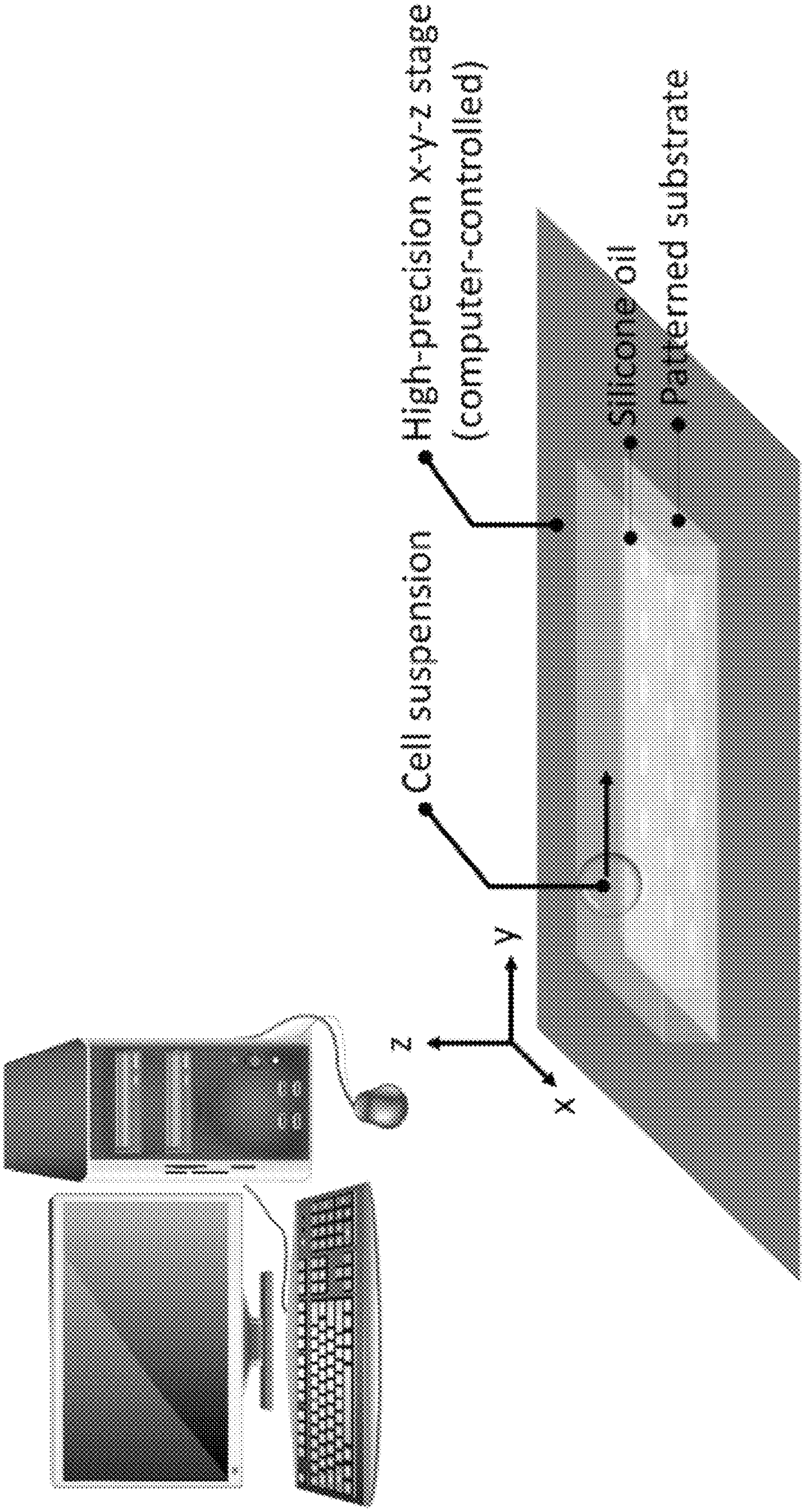
FIG. 7 is an illustration of a portion of a method of initiating perfect liquid repellency, in accordance with an aspect of the present disclosure.

Referring to FIG. 3, some examples of chemically patterned surfaces are shown. In these examples, the white area of the first solid surfaces 18 can be chemically modified to provide perfect liquid repellency for a predetermined first liquid 14 and second liquid 16 and the gray areas can be chemically modified to provide finite liquid repellency for the predetermined first liquid 14 and second liquid 16, or vice versa. These examples are not intended to be limiting and are only a few of the nearly infinite number of possibilities for patterning of the first solid surface.

In some cases, the first solid surface 18 has a three-dimensional shape that affords manipulation of the first droplet 12 of the first liquid 14 within the second liquid 16. These solid surfaces can be referred to as "physical patterned surfaces".

In some cases, the first solid surface 18 is smooth.

The injector 22 can be configured to deliver the first droplet 12 of the first liquid 14 directly into the second liquid 16 (in other words, while the portion of the injector 22 from which the first liquid 14 emerges is submerged under the second liquid 16). In these cases, it can be useful to have at least the portion of the injector 22 from which the first liquid 14 emerges be composed of an injector material that also satisfies the conditions for perfect liquid repellency with respect to the first liquid 14 and the second liquid 16. In other words, the first liquid 14 and the injector material can have a known first liquid-injector interfacial tension, the second liquid 16 and the injector material can have a known second liquid-injector interfacial tension, the first liquid 14 and the second liquid 16 can have a known first liquid-second liquid interfacial tension, and the first liquid-injector interfacial tension is greater than or equal to the sum of the first liquid-second liquid interfacial tension and the second liquid-injector interfacial tension. In some cases, the injector 22 can include a label identifying the specific first liquid 14 and second liquid 16 for which the injector material is configured to satisfy the conditions for perfect liquid repellency, so a user can easily identify the appropriate injector 22 for a given pair of liquids. The label can take any form, including a reference number that identifies the pair of liquids in a lookup table. It should be appreciated that aspects of the injector 22 described above can be applicable to an injector tip, which can be a removable and replaceable tip and which can be optionally disposable.

The injector 22 can be configured to deliver first droplet 12 by releasing the first droplet 12 above the second liquid 16 and allowing gravity to bring the first droplet 12 into position. This arrangement is only suitable for conditions where the first liquid 14 is sufficiently dense relative to the second liquid 16 and a person having ordinary skill in the art could determine the conditions under which this is achievable either by computational methods or by routine experimental optimization.

In either instance described above with respect to the injector 22, the injector 22 can have a mechanism for pushing the first liquid 14 out of the injector. For example, non-limiting examples of such a mechanism include a plunger mechanism, a pump mechanism, such as a peristaltic pump, and the like. The computer 42 can be coupled to the injector 22 and configured to control introduction of the first liquid.

In some cases, the injector 22 can be handheld and movable by a user.

The injector 22 can have an associated first liquid reservoir 40, which can be configured to retain a volume of the first liquid 14 for introduction via the injector 22.

In some cases, the injector 22 can be coupled to an injector translator 24. The coupling can be achieved by any physical linkage understood to those of ordinary skill in the mechanical arts. The injector translator 24 can be configured to move the injector 22 relative to the first solid surface 18. Non-limiting examples of a suitable injector translator 24 can include an x-y-z translation stage, a robotic arm, a linear actuator, a track-based motion system, and the like. In some cases, the injector 22 can be rotatable relative to the first solid surface 18. Though not illustrated, non-limiting examples of suitable mechanisms for rotating the injector 22 include a gear-based rotation system, a drive-shaft system, a belt-based rotation system, and the like. While the injector translator 24 has been described here generally in the context of translation in 3-dimensions relative to the first solid surface 18 and the rotation of the injector 22 has been described in specific contexts, the system 10 can include an injector translator 24 that is configured to provide motion to the injector 22 with six degrees of freedom (three translational degrees of freedom and three rotational degrees of freedom), as will be understood by those having ordinary skill in the mechanical arts. The computer 42 can be coupled to the injector translator 24 and programmed to control its function in ways understood by those having ordinary skill in the electrical arts. Movement patterns, rates of speed, and the like can all be controlled by the computer 42.

The injector 22 can optionally include a mixing chamber, where solutes or dispersed phases can be introduced into the first liquid 14. The solutes or dispersed phases can already be present in the first liquid and no mixing chamber would then be required, but a mixing chamber can be a means of controllably adjusting the amount of a solute or dispersed phase in a given droplet 12. For example, the injector 22 can be configured to introduce an increasing amount of a solute into the first liquid 14 as time progresses, thereby providing an increasing concentration of the solute in subsequent droplets 12. Alternatively or in combination, the injector 22 can be configured to introduce different solutes or dispersed phases into the first liquid.

The first solid surface translator 26 can be coupled to the first solid surface 18 and configured to translate the first solid surface 18 relative to the injector 22. In some cases, the first solid surface translator 26 will also incidentally move the reservoir 20, though that is not a necessary feature. The first solid surface translator 26 can deploy any of the mechanisms of movement described above with respect to the injector translator 24, though the movements will generally be more limited due to the fact that the motion should be controlled to not be overly disturbing to the second liquid 16 within the reservoir 18 (though if that is desired, the first solid surface translator 26 can be configured to disturb the second liquid 16). In some cases, the motion of the first solid surface 18 can be controlled to avoid movement of any droplets 12 of the first liquid 14 that have already been deposited into the second liquid 16. In some cases, the motion of the first solid surface 18 can be controlled to intentionally induce movement of droplets 12 of the first liquid 14 that have already been deposited in the second liquid 16. The computer 42 can be configured to control movement of the first solid surface 18 via the first solid surface translator 26.

The electrostatic manipulator 28 can be configured to interact electrostatically with a droplet 12 to initiate movement of the droplet 12. The electrostatic manipulator 28 can be handheld or can be coupled to an automated movement mechanism, such as those described above with respect to the injector translator 24. The computer 42 can be configured to control electrostatic properties of the electrostatic manipulator 28 and/or to control the optional automated movement mechanism with which the electrostatic manipulator 28 is associated.

In some cases, the electrostatic manipulator 28 can be one or more electrodes 50 positioned relative to the first solid surface 18 in a fashion suitable to effect an electrostatic force on the droplet 12 to initiate movement of the droplet. The one or more electrodes 50 can be positioned under the first solid surface 18.

The magnetic manipulator 30 can be configured to interact magnetically with a droplet 12 to initiate movement of the droplet 12. The magnetic manipulator 30 can be handheld or can be coupled to an automated movement mechanism, such as those described above with respect to the injector translator 24. The computer 42 can be configured to control magnetic properties of the magnetic manipulator 30 and/or to control the optional automated movement mechanism with which the magnetic manipulator 30 is associated.

The optical tweezers manipulator 32 can be configured to emit one or more optical beams that are configured to interact with the droplet 12 and initiate movement of the droplet 12 using optical tweezers principles. The optical tweezers manipulator 32 can be handheld, can be coupled to an automated movement mechanism, such as those described above with respect to the injector translator 24, and/or can have directional control of its emitted optical beam(s). Optical tweezers manipulation of the droplets 12 can be achieved by methods understood to those having ordinary skill in the optical arts. The computer 42 can be configured to control optical properties of the light emitted from the optical tweezers manipulator 32, such as intensity, focus, and direction, and/or to control the optional automated movement mechanism with which the optical tweezers manipulator 32 is associated.

The acoustic manipulator 34 can be configured to emit acoustic waves that are configured to interact with the droplet 12 and initiate movement of the droplet 12. The acoustic manipulator 34 can be handheld, can be coupled to an automated movement mechanism, such as those described above with respect to the injector translator 24, and/or can have directional control of its emitted acoustic waves. Acoustic manipulation of the droplets 12 can be achieved by methods understood to those having ordinary skill in the acoustic arts. The computer 42 can be configured to control the properties of the acoustic waves emitted from the acoustic manipulator 34, such as intensity, focus, and direction, and/or to control the optional automated movement mechanism with which the acoustic manipulator 34 is associated.

The slope introduction actuator 36 can be coupled to the first solid surface 18 and configured to introduce a controllable slope to the first solid surface 18. The controllable slope can be utilized to initiate and/or control movement of droplets 12. The computer 42 can be configured to control the slope of the first solid surface 18 via the slope introduction actuator 36.

The pump 38 can be in fluid communication with the reservoir 20 and can be configured to initiate a controllable fluid flow pattern within the reservoir 20. The controllable fluid flow pattern can be used to control movement of droplets 12. The computer 42 can be configured to control the fluid flow pattern via the pump 38.

The physical manipulator 44 can be configured to physically interact with the droplet 12 and initiate movement of the droplet 12 via physical forces. In some cases, the injector 22 can serve as a physical manipulator 44. The physical manipulator 44 can be handheld or can be coupled to an automated movement mechanism, such as those described above with respect to the injector translator 24. The computer 42 can be configured to control the optional automated movement mechanism with which the physical manipulator 44 is associated.

Methods

This disclosure also provides various methods. In one aspect, the present disclosure provides a method of patterning a solid surface. In another aspect, the present disclosure provides a method of initiating perfect liquid repellency. In yet another aspect, the present disclosure provides a method of manipulating volumes or droplets of liquid that are exhibiting perfect liquid repellency. It should be appreciated that aspects of these inventions can be used with or without one another. For example, a solid surface that is patterned using the methods described herein can be used in a method of initiating perfect liquid repellency described herein or a method of manipulating volumes or droplets of liquid described herein. Similarly, a method of initiating perfect liquid repellency can be used in concert with a method of manipulating volumes or droplets of liquid that are exhibiting perfect liquid repellency. Aspects of one given method, such as identifying a particular liquid in a given context, can be applicable to other methods in ways that are understood to those having ordinary skill in the art. For example, a person of ordinary skill would understand that a liquid that can be moved while maintaining perfect liquid repellency can also be a liquid in a method of initiating perfect liquid repellency.

In one aspect, the present disclosure provides a method of initiating perfect liquid repellency. The method can include introducing a first volume of a first liquid into a second volume of a second liquid above a first location on a first solid surface. The first liquid and the second liquid have a known first liquid-second liquid interfacial tension. The first liquid and the first location on the first solid surface have a known first liquid-first location interfacial tension. The second liquid and the first location on the first solid surface have a known second liquid-first location interfacial tension. The first liquid-first location interfacial tension is greater than or equal to the sum of the first liquid-second liquid interfacial tension and the second liquid-first location interfacial tension, thereby giving rise to perfect liquid repellency between the first liquid and the first location on the first solid surface.

The method can further include moving the first volume of the first liquid from the first location on the first solid surface to a second location on the first solid surface. The second location is positioned at a first pre-determined distance and direction relative to the first location. The first liquid and the second location on the first solid surface have a known first liquid-second location interfacial tension. The second liquid and the second location on the first solid surface have a known second liquid-second location interfacial tension. The first liquid-second location interfacial tension is greater than or equal to the sum of the first liquid-second liquid interfacial tension and the second liquid-second location interfacial tension, thereby giving rise to perfect liquid repellency between the first liquid and the second location on the first solid surface.

The method can further include moving the first volume of the first liquid from the first location or the second location on the first solid surface to a third location on the first solid surface. The third location is positioned at a second pre-determined and direction relative to the first or second location. The first liquid and the third location on the first solid surface have a known first liquid-second location interfacial tension. The second liquid and the third location on the first solid surface have a known second liquid-third location interfacial tension. The first liquid-third location interfacial tension is less than the sum of the first liquid-second liquid interfacial tension and the second liquid-third location interfacial tension, thereby initiating finite liquid repellency between the first volume of the first liquid and the third location on the first solid surface.

In another aspect, the present disclosure provides a method of making a plurality of drops of a first liquid exhibiting perfect liquid repellency in a second volume of a second liquid covering a first surface. The method can include: a) introducing a first volume of the first liquid into the second volume of the second liquid above a first location on a first solid surface; and b) introducing a third volume of the first liquid into the second volume of the second liquid above a second location on the first solid surface. The first volume of the first liquid and the third volume of the first liquid can have material properties relative to the properties of the second liquid and the first and second locations of the first solid surface that satisfy the conditions necessary to achieve perfect liquid repellency, as discussed above and elsewhere herein.

The introducing of steps a) and b) of the method can use an injector. The method can further include moving the injector relative to the first solid surface between steps a) and b). The method can further include moving the first solid surface relative to the injector between steps a) and b). The method can further include moving both the injector and the first solid surface relative to one another between steps a) and b).

The method can further include c) introducing a plurality of additional volumes of the first liquid into the reservoir of the second liquid above a respective plurality of locations on the first solid surface. The plurality of additional volumes of the first liquid can have material properties relative to the second liquid and the respective plurality of additional locations on the first solid surface that satisfy the conditions necessary to achieve perfect liquid repellency, as discussed above and elsewhere herein.

The introducing of step c) can use one or more injectors. The method can further include moving the one or more injectors relative to the first solid surface during the introducing of step c). The method can further include moving the first solid surface relative to the one or more injectors during the introducing of step c). The method can further include moving both the one or more injectors and the first solid surface relative to one another during the introducing of step c).

In some cases, the plurality of additional volumes are introduced in step c) at a constant rate. In some cases, the plurality of additional volumes are introduced in step c) at a varying rate. In some cases, the plurality of additional volumes have the same volume. In some cases, at least a portion of the plurality of additional volumes have different volumes. In some cases, the plurality of additional volumes can have the same contents.

In some cases, at least a portion of the plurality of additional volumes can have different contents. The different contents can include different concentrations, quantities, types, or a combination thereof of one or more components within the additional volumes. Volumes of the first liquid can contain one or more component. One or more components can include chemical reactants, ions, salts, buffers, cells, biological molecules, particles, tissues, organisms, polymers, or other additional components. In some cases, a volume of the first liquid can contain at least one cell or one and only one cell. In some cases, the biological molecule can be a nucleic acid, a protein, or a combination thereof. In some cases, the particle can be a magnetic bead. In some cases, the polymers can form a polymeric matrix. In some cases, the polymeric matrix can be embedded with at least one particle or at least one cell.

In some cases, the types of cells can be varied between different volumes to isolate cells of different types.

In cases where the plurality of additional volumes have different volumes and/or contents, the method can further include sorting the at least a portion of the plurality of additional volumes by size and/or content.

In some cases, the methods can include splitting a volume of the first liquid into two distinct volumes.

In some cases, the methods can include extracting at least a portion of a volume of the first liquid from the second liquid.

The first liquid and the second liquid can be immiscible.

In some cases, the methods can further include forming a coating at an interface between one or more of the volumes of the first liquid and the second liquid. In some cases, the one or more additional volumes can have different contents to form different coatings at their respective interfaces with the second liquid.

The method can include varying ion concentrations in the one or more volumes to produce different protein crystallization conditions for proteins located within the at least a portion of the plurality of additional volumes.

The methods can further include observing liquid-liquid interactions at an interface between one or more of the volumes of the first liquid and the second liquid.

The methods can further include performing a chemical reaction at an interface between one or more of the volumes of the first liquid and the second liquid.

The methods can further include performing a chemical reaction in one or more of the volumes of the first liquid.

The methods can further include moving two volumes to cause the two volumes to merge into a unified volume. This merger can be utilized to produce unique isolated reaction conditions, where reactants are isolated until the volumes are merged, and then the progress of the reaction is monitored following the merger.

Inspired by the atom stacking principle in crystallography, spheres of hydrogel can be automatically organized in a designated space (e.g., a microwell), showing up a specific pattern of contact. This stacking technique doesn't require individual control of positioning on each component sphere and the formed pattern of contact is reliable.

The first volume, third volume, or additional volumes can be between 1 yoctoliter and 1 yottaliter, between 1 zeptoliter and 1 zettaliter, between 1 attoliter and 1 exaliter, between 1 femtoliter and 1 petaliter, between 1 picoliter and 1 teraliter, between 10 picoliters and 1 gigaliter, between 100 picoliters and 1 megaliter, between 1 nanoliter and 1 kiloliter, between 10 nanoliters and 1 liter, between 100 nanoliters and 100 milliliters, between 1 microliter and 10 milliliters, between 5 nanoliters and 5 milliliters, between 50 nanoliters and 1 milliliter, between 500 picoliters and 100 microliters, between 250 picoliters and 10 microliters, between 50 picoleters and 1 microliter, between 5 picoliters and 100 microliters, between 500 femotliters and 10 microliters, between 50 femtoliters and 1 microliter, between 5 femtoliters and 100 nanoliters, between 500 attoliters and 10 nanoliters, between 50 attoliters and 1 nanoliter, between 5 attoliters and 100 picoleters, up to 10 picoliters, up to 1 picoliter, up to 100 femtoliters, up to 10 femtoliters, up to 1 femtoliter, up to 100 attoliters, up to 10 attoliters, up to 1 attoliter, up to 100 zeptoliters, up to 10 zeptoliters, up to 1 zeptoliter, up to 100 yoctoliters, up to 10 yoctoliters, and other combinations of the bounds of these ranges that are not explicitly recited.

The second volume can be sufficient to cover the first volume. The second volume can be between 1 yoctoliter and 1 yottaliter, between 1 zeptoliter and 1 zettaliter, between 1 attoliter and 1 exaliter, between 1 femtoliter and 1 petaliter, between 1 picoliter and 1 teraliter, between 10 picoliters and 1 gigaliter, between 100 picoliters and 1 megaliter, between 1 nanoliter and 1 kiloliter, between 10 nanoliters and 1 liter, between 100 nanoliters and 100 milliliters, between 1 microliter and 10 milliliters, between 5 nanoliters and 5 milliliters, between 50 nanoliters and 1 milliliter, between 500 picoliters and 100 microliters, between 250 picoliters and 10 microliters, between 50 picoleters and 1 microliter, between 5 picoliters and 100 microliters, between 500 femotliters and 10 microliters, between 50 femtoliters and 1 microliter, between 5 femtoliters and 100 nanoliters, between 500 attoliters and 10 nanoliters, between 50 attoliters and 1 nanoliter, between 5 attoliters and 100 picoleters, up to 10 picoliters, up to 1 picoliter, up to 100 femtoliters, up to 10 femtoliters, up to 1 femtoliter, up to 100 attoliters, up to 10 attoliters, up to 1 attoliter, up to 100 zeptoliters, up to 10 zeptoliters, up to 1 zeptoliter, up to 100 yoctoliters, up to 10 yoctoliters, and other combinations of the bounds of these ranges that are not explicitly recited.

The first liquid can be an aqueous liquid. The second liquid can be an oil, such as a fluorinated oil or silicone oil. For example, the first location and/or second location on the first solid surface can be polydimethylsiloxane, polytetrafluoroethylene, and the like.

The first liquid can be an oil. The second liquid can be an aqueous liquid. The first location and/or second location on the first solid surface can be a material which is completely wettable by water or an aqueous liquid. For example, the first location and/or second location on the first solid surface can be an $O_2$-plasma-treated surface, such as $O_2$-plasma-treated glass, an acid-treated solid, such as an acid-treated metal, silicon, mica, graphene, or polymers, or the like.

The first liquid can be volatile. The first liquid can have a vapor pressure of at least 1 atmosphere at 0° C., 10° C., 20° C., 25° C., or 30° C.

The first liquid and second liquid can be substantially free of surfactants.

It should be appreciated that the specific first liquids, second liquids, and locations on the first solid surface specified herein are merely a subset of the possible liquids and chemical compositions of surfaces that can achieve perfect liquid repellency. A person having ordinary skill in the art could identify more combinations by comparing physical properties of known materials and experimentally testing promising candidates.

It should be appreciated that this method can be modified to replace the third volume of the first liquid with a third volume of a third liquid. The third volume of the third liquid can have material properties relative to the properties of the second liquid and the second location of the first solid surface that satisfy the conditions necessary to achieve perfect liquid repellency, as discussed above and elsewhere herein. It should also be appreciated that this method can be modified to replace the plurality of additional volumes of the first liquid with a plurality of additional volumes of additional liquids. The plurality of additional volumes of additional liquids can have material properties relative to the properties of the second liquid and the respective plurality of locations of the first solid surface that satisfy the conditions necessary to achieve perfect liquid repellency, as discussed above and elsewhere herein. Generally speaking, the first liquid as described herein can be substituted with a different liquid that retains the properties necessary to exhibit perfect liquid repellency.

The methods can include, prior to any steps of providing a liquid, selecting the first liquid, the second liquid, and a material of the surface to have respective interfacial tensions sufficient to give rise to perfect liquid repellency.

The third location on the first solid surface can be a material which is partially wettable by water and oil. The third location can include chemical compositions of surfaces that are not suitable for achieving perfect liquid repellency. For example, the solid can be polystyrene, which can be partially wetted by water and oil, such as fluorinated oil, silicone oil, or mineral oil. Finite liquid repellency can be exhibited in this case whether water is continuous phase or oil is continuous phase.

In yet another aspect, the present disclosure provides a method of patterning a first solid surface.

The patterning can include selectively depositing a modifier molecule onto the first solid surface on the first or second portion. Prior to the patterning, the method can include applying a mask to the first solid surface to selectively block the deposition of the modifier molecule onto the first solid surface.

The patterning can include depositing a modifier molecule onto the first solid surface on the first and second portion and selectively removing the modifier molecule from the first or second portion. Prior to the selectively removing, the method can include applying a mask to the first solid surface to selectively block the removal of the modifier molecule from the first solid surface.

The patterning can include a mask-free method that directly adds a modifier molecule to or removes a modifier molecule from the first solid surface. The mask-free method can include hand writing, stamping, ink printing, fused deposition, computer-controlled xurography, computer-controlled machining, laser cutting, e-beam direct writing and combinations thereof.

The patterning can be selected to take any preferred shape and can achieve a variety of functions by way of the selected pattern. For example, the patterning can be configured to provide selective distribution of contents of volumes of the first liquid. The contents are the same as those described above. As another example, the patterning can be configured to provide selective merging or separation of the volumes of first liquid.

The patterning can include fabrication of two-dimensional continuous fluidic channels for the first liquid to form lateral flow in the second liquid on the first solid surface. As used herein, "lateral" flow refers to flow that is not induced or contributed to by gravitational force.

The patterning can include fabricating three-dimensional continuous fluidic channels for the first liquid to form vertical flow in the second liquid on the first solid surface. As used herein, "vertical" flow refers to flow that is inducted or contributed to by gravitational force.

The depositing or selectively depositing can include chemical etching, $O_2$-plasma etching, UV oxidation, e-beam lithography, and other surface modification methods known to those having ordinary skill in the art.

The masks described herein can be a material that selectively blocks vapor deposition of a modifier molecule onto the first solid surface, such as a chemically inert mask, masking tape, press-to-seal silicone rubber, a photoresist, or the like.

Referring to FIGS. 4 to 7, one specific method of patterning a surface and then initiating perfect liquid repellency is illustrated.

Compositions of Matter

This disclosure also provides a composition of matter. The composition of matter can include a first solid surface, a first volume of a first liquid, and a second volume of a second liquid. The second volume of the second liquid is sufficient to fully encapsulate the first volume. The first liquid and the second liquid have a known first liquid-second liquid interfacial tension. The first liquid and the solid surface have a known first liquid-solid interfacial tension. The second liquid and the first solid surface have a known second liquid-solid interfacial tension. The first liquid-solid interfacial tension is greater than or equal to the sum of the first liquid-second liquid interfacial tension and the second liquid-solid interfacial tension, thereby giving rise to perfect liquid repellency between the first liquid and the first solid surface.

Kits

This disclosure also provides a kit for providing a droplet of a first liquid submerged under a second liquid and exhibiting perfect liquid repellency. The kit can include a substrate and a liquid identifier. The substrate has a solid surface. The liquid identifier identifies the first liquid and the second liquid. The first liquid, the second liquid, and the first solid surface have material properties necessary to achieve perfect liquid repellency, as described above and elsewhere herein.

The kit can further include an injector identifier. The injector identifier identifies a material suitable for use with an injector for injecting a droplet of the first liquid and maintaining the perfect liquid repellency.

The kit can further include an injector tip. The injector tip can have at least a tip portion composed of an injector material. The first liquid and the injector material have a known first liquid-injector interfacial tension. The second liquid and the injector material having a known second liquid-injector interfacial tension. The first liquid-injector interfacial tension is greater than or equal to the sum of the first liquid-second liquid interfacial tension and the second liquid-injector interfacial tension.

EXAMPLES

Example 1. Undermedia Perfect Liquid Repellency

To verify the principles discussed above experimentally, three smooth solid materials were chosen, namely, polydimethylsiloxane (PDMS), polystyrene (PS), and $O_2$ plasma-treated glass. These solid surfaces were coupled with three water-oil pairs, water paired with mineral oil, silicone oil, and fluorinert FC-40. Ultrapure distilled water, anhydrous ethanol (99.5%), premium microscope slides, 4-well omnitray dish (PS, non-treated, sterile) were purchased from Thermo Fisher Scientific. Silicone oil (viscosity 5 cSt, 25° C.), mineral oil (embryo culture tested), fluorinert FC-40, and toluene (ACS reagent, >99.5%) were purchased from Sigma Aldrich. Sylgard 184 elastomer clear kit (with curing agent) was purchased from Dow Corning. 1,3-dichlorotetramethylsiloxane (PDMS-silane, SID3372.0) was purchased from Gelest. Assorted food color and egg dye were purchased from McCormick. All chemicals and materials were used as received.

Figure 8:
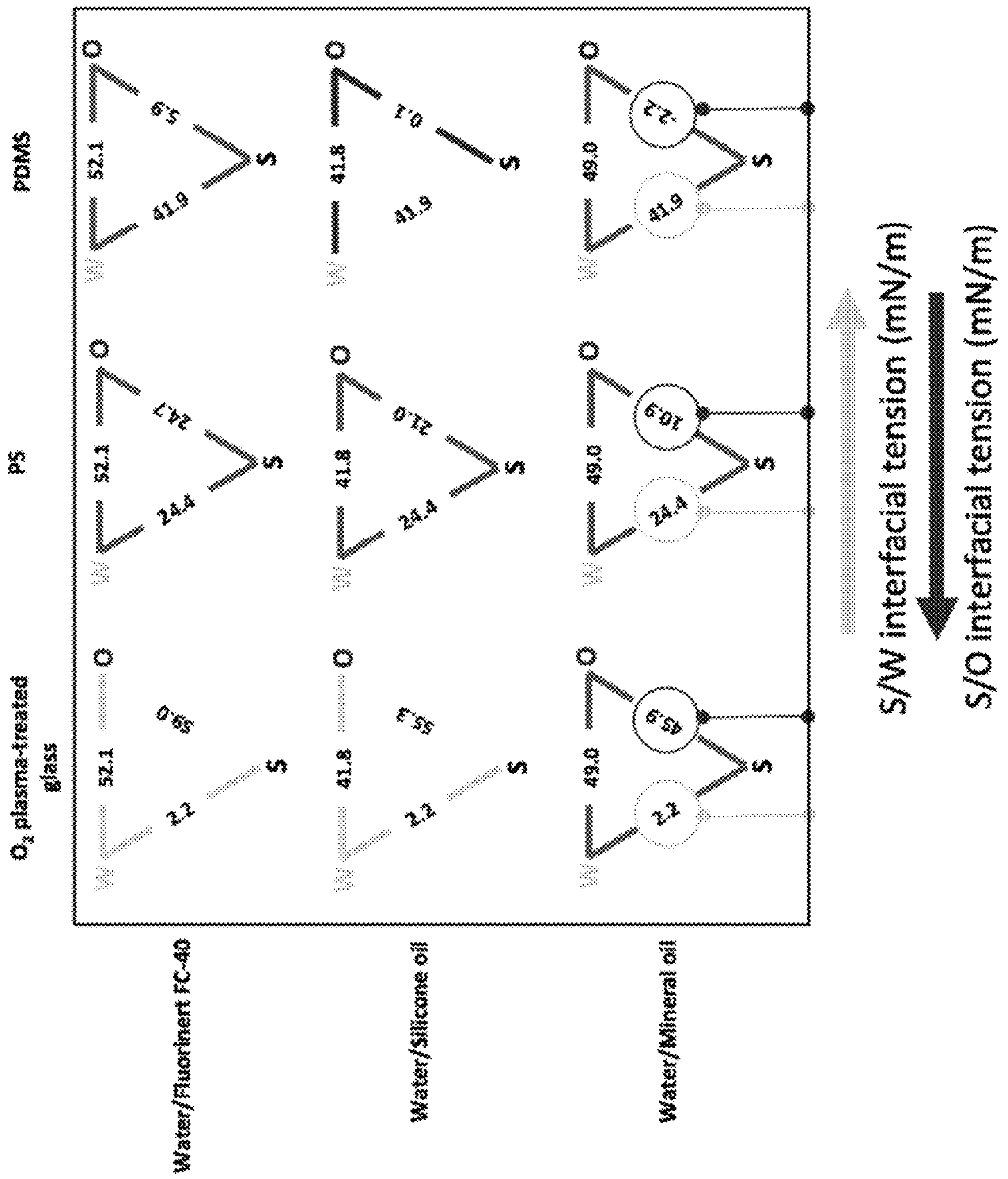
FIG. 8 is a 3×3 matrix showing the S/W/O triangles for three pairs of liquids and three solid surfaces, in accordance with an aspect of the present disclosure.
Figure 9:
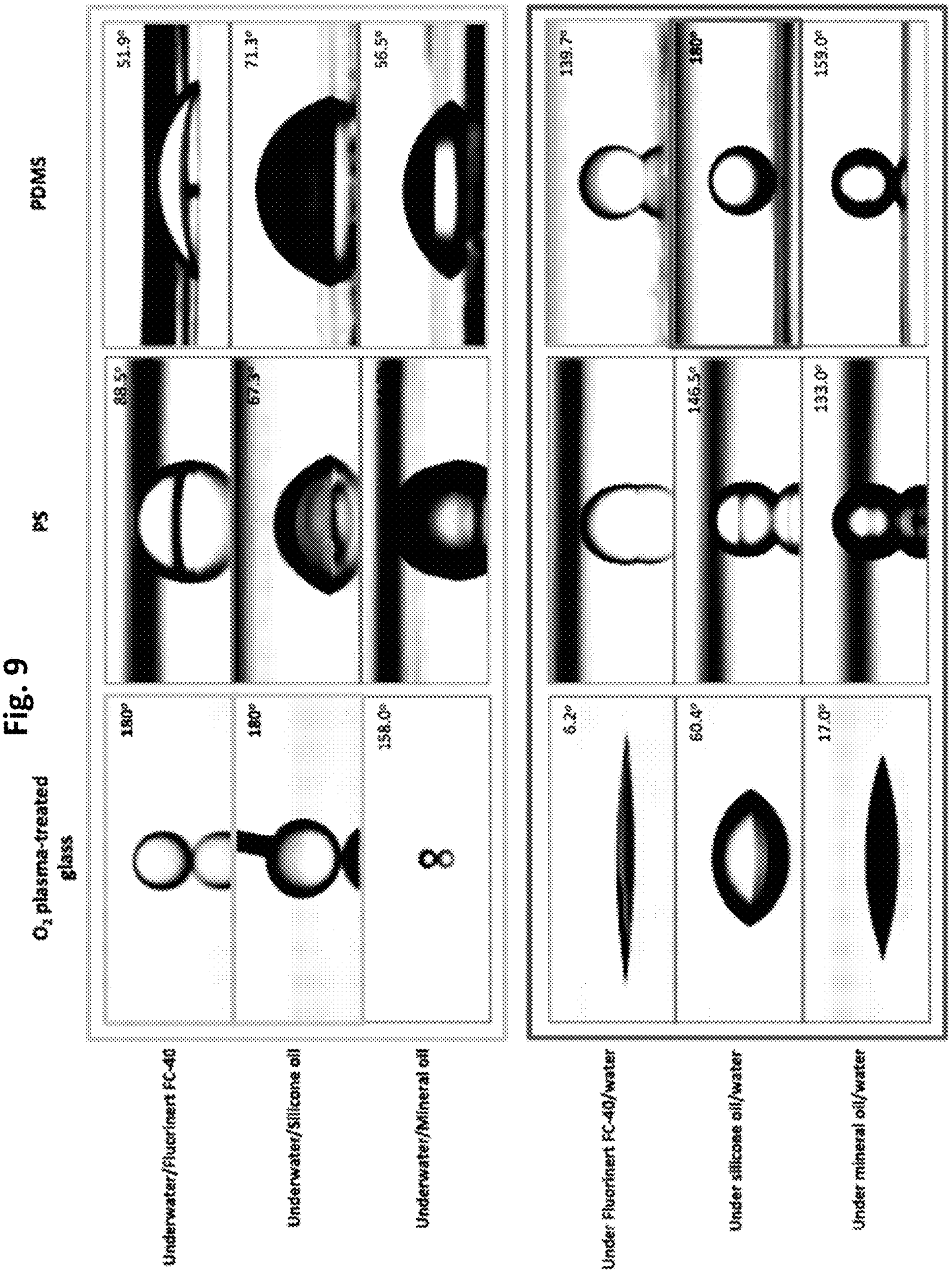
FIG. 9 is a matrix of images of contact angles of undermedia repellency for the three pairs of liquids and three solid surfaces, in accordance with an aspect of the present disclosure.

The CAs of each test liquid on the three solid materials were measured in air to calculate the interfacial tensions of S/W and S/O. The results of the nine S/W/O triangles were organized in a 3×3 matrix (FIG. 8). A clear trend can be seen from the matrix. To achieve underoil perfect water repellency, the solid material must be relatively hydrophobic and oleophilic, featuring with a larger interfacial tension to water and a smaller interfacial tension to oil. Vice versa, underwater perfect oil repellency requires the solid material relatively hydrophilic and oleophobic. As shown on PDMS, if silicone oil is changed to either mineral oil or fluorinert FC-40, underoil perfect water repellency is not observed because the interfacial tension between water and mineral oil or fluorinert FC-40 is too large (FIG. 9, orange right column). An analogous effect can be observed on $O_2$ plasma-treated glass (FIG. 9, blue left column). Provided that a solid material shows no obvious preference between water and oil (e.g. PS), no matter which (water or oil) is used as continuous phase undermedia perfect liquid repellency will not be achievable (FIG. 9, center column).

Referring to FIG. 9, undermedia CAs measured with a standard goniometer (Ramé-Hart 200-00) in response to the nine S/W/O triangles are shown. Blue corresponds to underwater conditions and orange to underoil conditions. On $O_2$ plasma-treated glass, undermedia perfect liquid repellency shows up only if water is set as continuous phase and paired with silicone oil and fluorinert FC-40. A drop of silicone oil was attached to a stainless steel needle to enable the measurement on $O_2$ plasma-treated glass under water (see details at SI Methods). On PDMS, undermedia perfect liquid repellency shows up only if silicone oil is set as continuous phase and paired with water. All of the other systems show undermedia finite liquid repellency.

PDMS surfaces were prepared using the following method. PDMS precursors were mixed with a 1:10 base to curing agent ratio. The mixture was thoroughly degassed, poured into a 4-well omnitray dish then cured in an oven at 60° C. for 48 h.

Example 2. PTFE and Control of Droplet Behaviors

Figure 10:
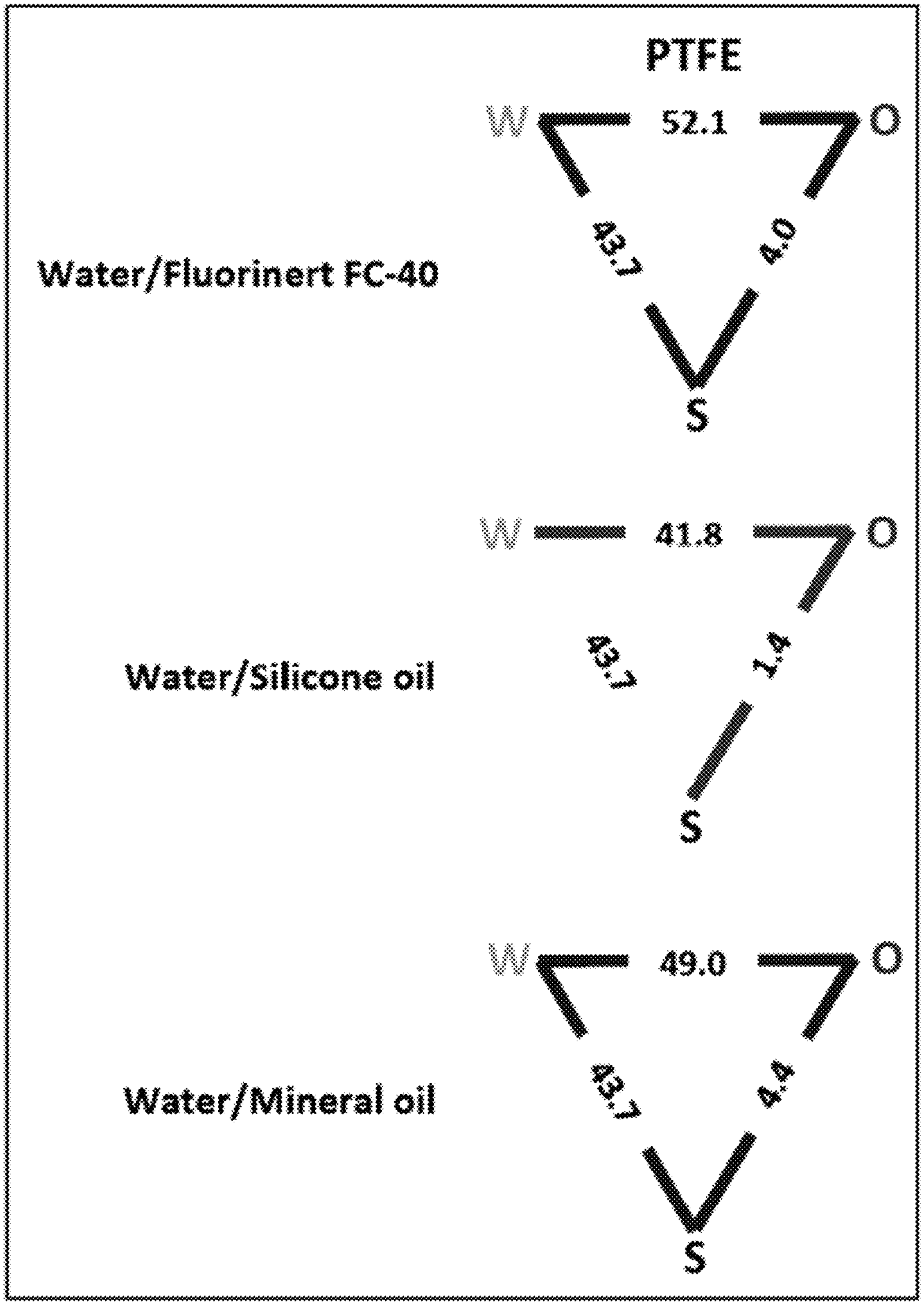
FIG. 10 is an illustration of undermedia perfect liquid repellency using polytetrafluoroethylene, in accordance with an aspect of the present disclosure.
Figure 10:
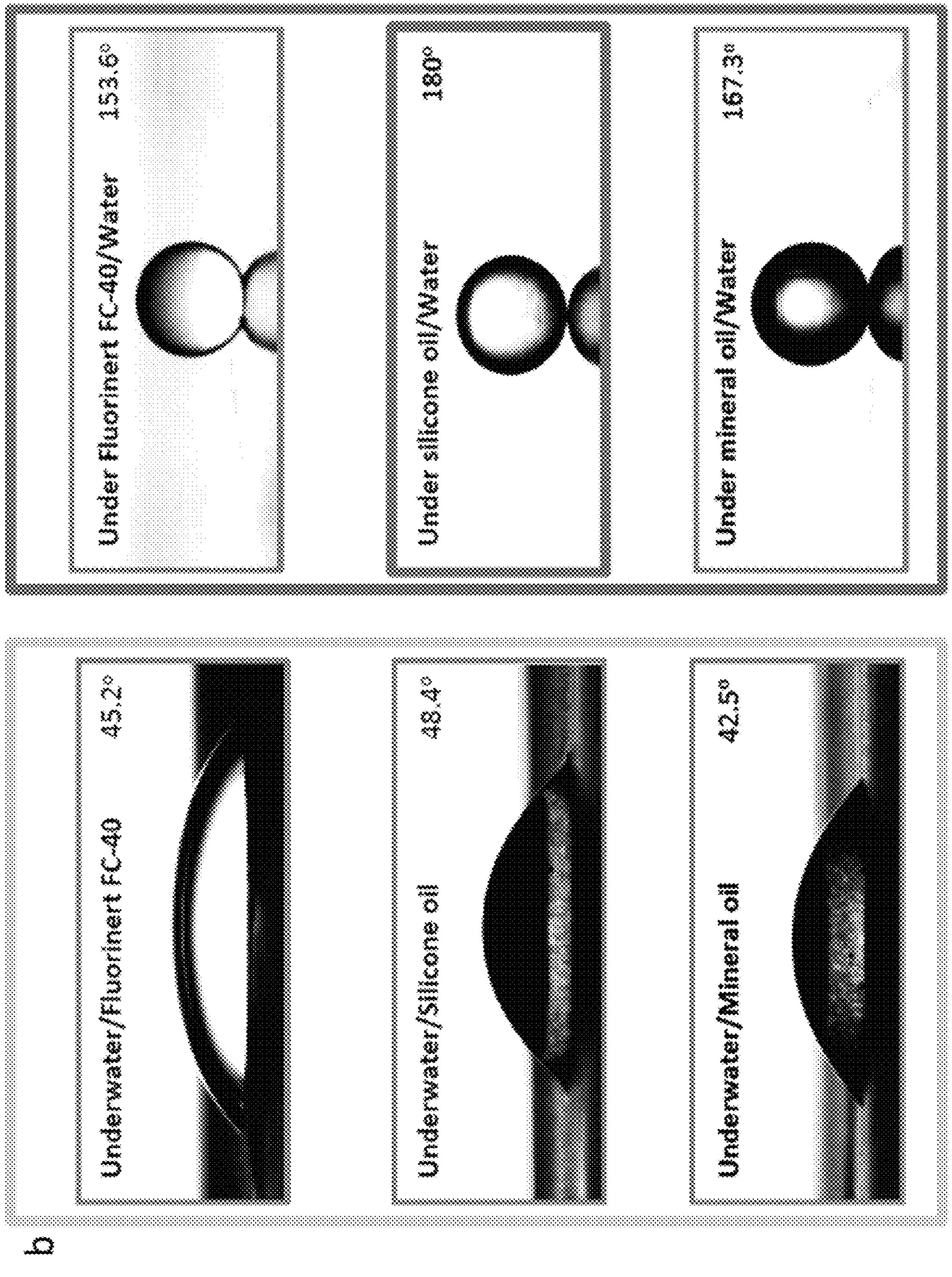
Figure 10:
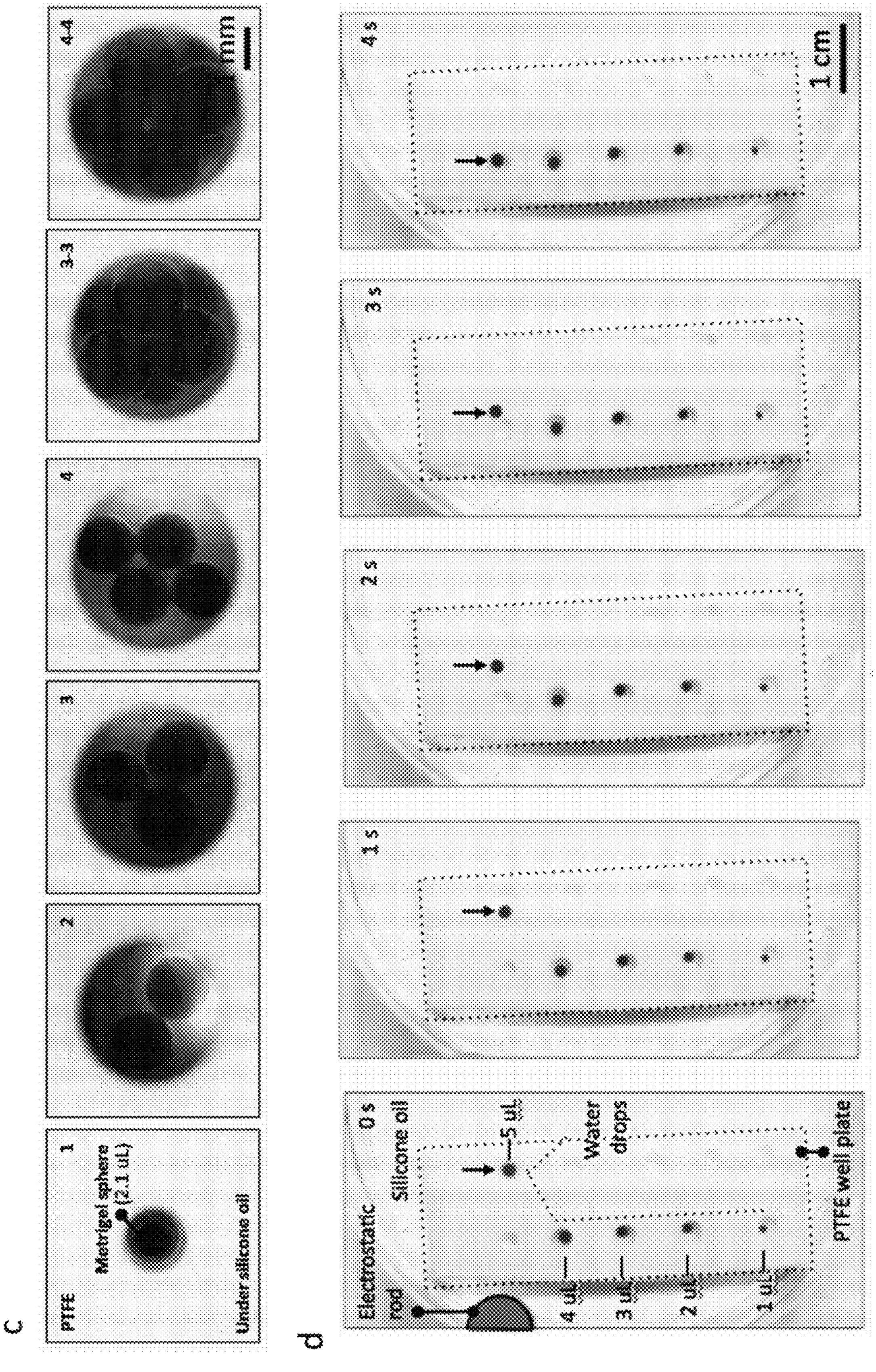

A polytetrafluorethylene (PTFE) surface was utilized to further explore the properties discussed herein. FIG. **10*a* shows the S/W/O triangles for PTFE. FIG. 10*b* shows the undermedia CAs measured on PTFE with a standard goniometer. FIG. 10*c* shows underoil sphere stacking of matrigel spheres under silicone oil. FIG. 10*d*** shows motion of underoil water spheres induced by an electrostatic field. A sphere of water was moved by an electrostatic rod having a charge of ~8 kV.

Example 3. Grafted PDMS-Silane and Volume Effects

Figure 11:
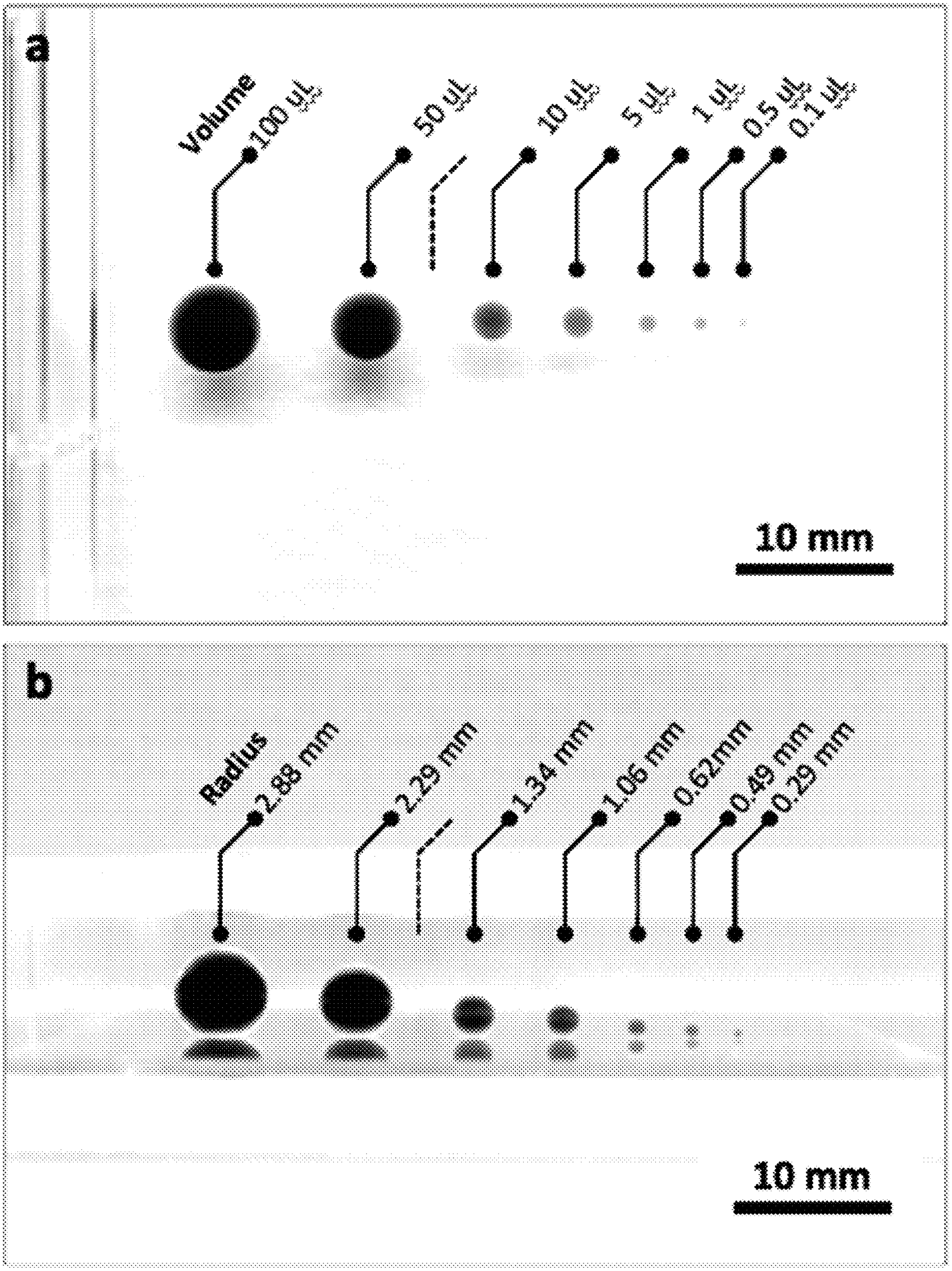
FIG. 11 is an image showing perfect liquid repellency of water attained on PDMS-silane-grafted glass under silicone oil, in accordance with an aspect of the present disclosure.

Focusing on conditions that support perfect water repellency under oil, we further explored the parameter space. If a solid material can be grafted by PDMS-silane, the modified substrate, water and silicone oil will form a SLL-2i. Here as an example glass was treated by PDMS-silane via RT chemical vapor deposition (CVD) (SI Methods). The PDMS-silane-grafted glass shows exactly the same underoil perfect water repellency as observed on PDMS (FIG. 11). Note that a relatively flattened bottom is observed when the radius of water droplets is close to or greater than the capillary length of water against silicone oil (i.e. the effect of gravity become noticeable). Impressively, all water droplets can move freely on the substrate without noticeable hysteresis and volume loss. Further testing demonstrated long-term stability (24 h) of the perfect water repellency achieved (FIG. 12).

Referring to FIG. 11, perfect water repellency was attained on PDMS-silane-grafted glass under silicone oil. FIG. 11*a* shows a top view of a series of water droplets with varying volume from 100 uL to 0.1 uL. FIG. 11*b* shows a side view of the water droplets in FIG. 11*a*. The water droplets (e.g. 100 uL and 50 uL) with a radius close to the capillary length of water against silicone oil (~2.1 mm) show a slightly flattened bottom due to the effect of gravity. All water droplets move freely on the substrate without noticeable hysteresis and volume loss.

Figure 12:
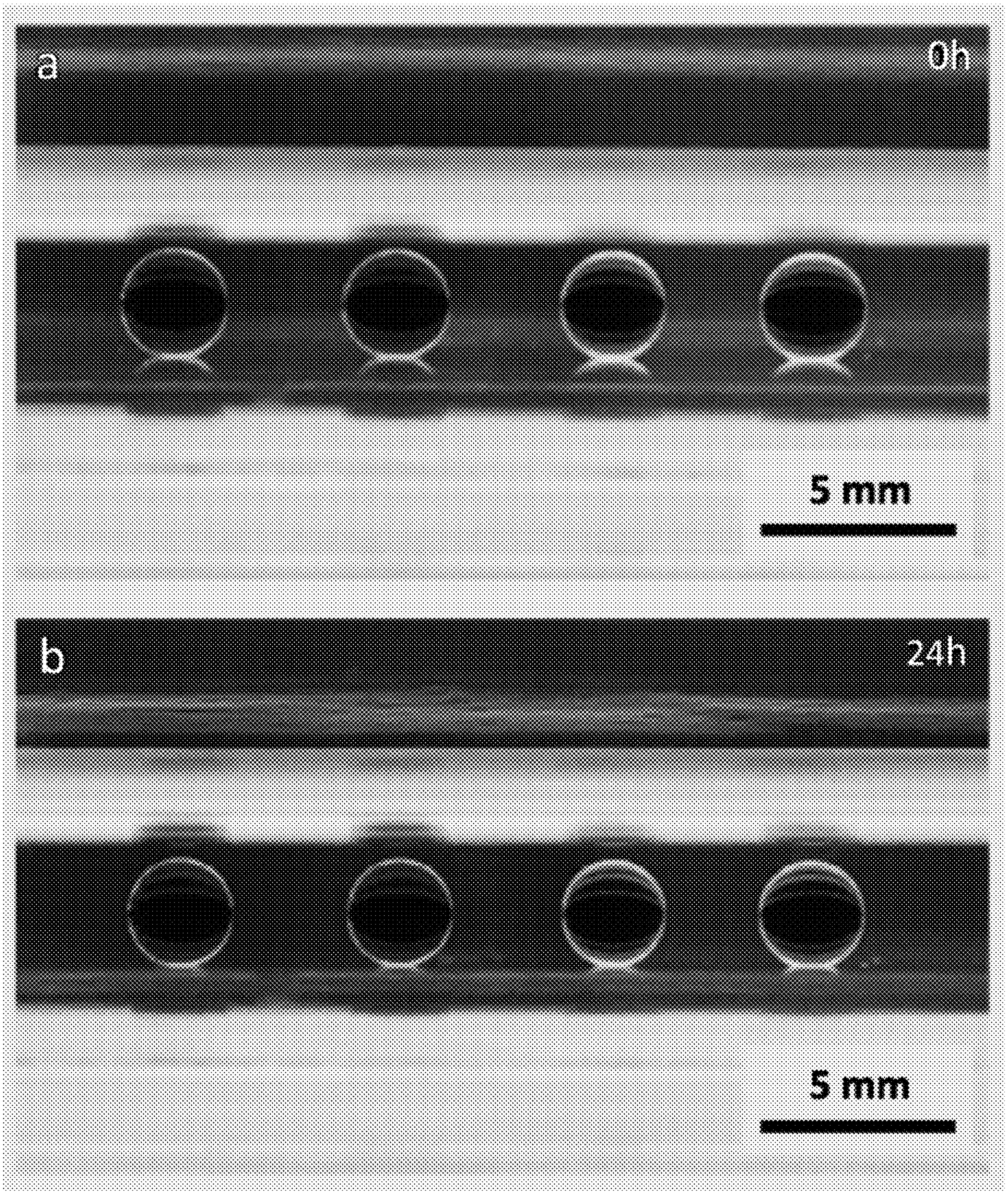
FIG. 12 is an image of long-term stability test results, in accordance with an aspect of the present disclosure.

Referring to FIG. 12, a long-term stability test of underoil (silicone oil) perfect water repellency on PDMS-silane-grafted glass was performed. Water droplets (10 uL of each) were dyed to red and blue for improved visualization. CAs were all maintained on 180° without any observable decline for at least 24 h.

PDMS-silane CVD was performed with the following method. Glass slide was first treated with $O_2$ plasma (100 W) for 5 min then transferred into a glass staining jar with lid. 10 uL of PDMS-silane was added to vaporize and condense on glass surface at RT. The entire process took 10 min. The modified glass slide was thoroughly rinsed with toluene, ethanol and DI water then dried in $N_2$.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the disclosures described herein can be embodied within a form that does not provide all of the features and benefits set forth herein, as some features can be used or practiced separately from others. The scope of certain disclosures disclosed herein is indicated by the appended claims rather than by the foregoing description. All changes which come within the meaning and range of equivalency of the claims are to be embraced within their scope.

We claim:

1. A method of making a droplet of a first liquid exhibiting perfect liquid repellency in a second volume of a second liquid covering a first solid surface, comprising:

a) introducing a first volume of a first liquid into a second volume of a second liquid above a first location on a first solid surface, the first liquid and the second liquid having a known first liquid-second liquid interfacial tension, the first liquid and the first location on the first solid surface having a known first liquid-first location interfacial tension, the second liquid and the first location on the first solid surface having a known second liquid-first location interfacial tension, wherein the first liquid-first location interfacial tension is greater than or equal to the sum of the first liquid-second liquid interfacial tension and the second liquid-first location interfacial tension, thereby giving rise to perfect liquid repellency between the first liquid and the first location on the first solid surface; and b) moving the first volume of the first liquid from the first location on the first solid surface to a second location on the first solid surface, the second location positioned at a first pre-determined distance and direction relative to the first location, the first liquid and the second location on the first solid surface having a known first liquid-second location interfacial tension, and the second liquid and the second location on the first solid surface having a known second liquid-second location interfacial tension, wherein the first liquid-second location interfacial tension is greater than or equal to the sum of the first liquid-second liquid interfacial tension and the second liquid-second location interfacial tension, thereby giving rise to perfect liquid repellency between the first liquid and the second location on the first solid surface.

2. A method of making a droplet of a first liquid exhibiting perfect liquid repellency in a second volume of a second liquid covering a first solid surface, comprising:

a) introducing a first volume of a first liquid into a second volume of a second liquid above a first location on a first solid surface, the first liquid and the second liquid having a known first liquid-second liquid interfacial tension, the first liquid and the first location on the first solid surface having a known first liquid-first location interfacial tension, the second liquid and the first location on the first solid surface having a known second liquid-first location interfacial tension, wherein the first liquid-first location interfacial tension is greater than or equal to the sum of the first liquid-second liquid interfacial tension and the second liquid-first location interfacial tension, thereby giving rise to perfect liquid repellency between the first liquid and the first location on the first solid surface; and moving the first volume of the first liquid from the first location on the first solid surface to a third location on the first solid surface, the third location positioned at a second pre-determined and direction relative to the first location, the first liquid and the third location on the first solid surface having a known first liquid-second location interfacial tension, the second liquid and the third location on the first solid surface having a known second liquid-third location interfacial tension, wherein the first liquid-third location interfacial tension is less than the sum of the first liquid-second liquid interfacial tension and the second liquid-third location interfacial tension, thereby initiating finite liquid repellency between the first volume of the first liquid and the third location on the first solid surface.

3. A method of making a droplet of a first liquid exhibiting perfect liquid repellency in a second volume of a second liquid covering a first solid surface, comprising:

a) introducing a first volume of a first liquid into a second volume of a second liquid above a first location on a first solid surface, the first liquid and the second liquid having a known first liquid-second liquid interfacial tension, the first liquid and the first location on the first solid surface having a known first liquid-first location interfacial tension, the second liquid and the first location on the first solid surface having a known second liquid-first location interfacial tension, wherein the first liquid-first location interfacial tension is greater than or equal to the sum of the first liquid-second liquid interfacial tension and the second liquid-first location interfacial tension, thereby giving rise to perfect liquid repellency between the first liquid and the first location on the first solid surface; and wherein the first volume of the first liquid is introduced into the second volume of the second liquid via an injector, the first liquid and the injector having a known first liquid-injector interfacial tension, the second liquid and the injector having a known second liquid-injector interfacial tension, wherein the first liquid-injector interfacial tension is greater than or equal to the sum of the first liquid-second liquid interfacial tension and the second liquid-injector interfacial tension.

4. A method of making a droplet of a first liquid exhibiting perfect liquid repellency in a second volume of a second liquid covering a first solid surface, comprising:

a) introducing a first volume of a first liquid into a second volume of a second liquid above a first location on a first solid surface, the first liquid and the second liquid having a known first liquid-second liquid interfacial tension, the first liquid and the first location on the first solid surface having a known first liquid-first location interfacial tension, the second liquid and the first location on the first solid surface having a known second liquid-first location interfacial tension, wherein the first liquid-first location interfacial tension is greater than or equal to the sum of the first liquid-second liquid interfacial tension and the second liquid-first location interfacial tension, thereby giving rise to perfect liquid repellency between the first liquid and the first location on the first solid surface; and wherein the first volume of the first liquid contains one and only one cell.

5. A method of making a droplet of a first liquid exhibiting perfect liquid repellency in a second volume of a second liquid covering a first solid surface, comprising:

a) introducing a first volume of a first liquid into a second volume of a second liquid above a first location on a first solid surface, the first liquid and the second liquid having a known first liquid-second liquid interfacial tension, the first liquid and the first location on the first solid surface having a known first liquid-first location interfacial tension, the second liquid and the first location on the first solid surface having a known second liquid-first location interfacial tension, wherein the first liquid-first location interfacial tension is greater than or equal to the sum of the first liquid-second liquid interfacial tension and the second liquid-first location interfacial tension, thereby giving rise to perfect liquid repellency between the first liquid and the first location on the first solid surface;

wherein the first liquid is an oil.

6. A method of making a droplet of a first liquid exhibiting perfect liquid repellency in a second volume of a second liquid covering a first solid surface, comprising:

a) introducing a first volume of a first liquid into a second volume of a second liquid above a first location on a first solid surface, the first liquid and the second liquid having a known first liquid-second liquid interfacial tension, the first liquid and the first location on the first solid surface having a known first liquid-first location interfacial tension, the second liquid and the first location on the first solid surface having a known second liquid-first location interfacial tension, wherein the first liquid-first location interfacial tension is greater than or equal to the sum of the first liquid-second liquid interfacial tension and the second liquid-first location interfacial tension, thereby giving rise to perfect liquid repellency between the first liquid and the first location on the first solid surface; and wherein the first volume of the first liquid contains a particle suspended in the first liquid.

7. A method of making a droplet of a first liquid exhibiting perfect liquid repellency in a second volume of a second liquid covering a first solid surface, comprising:

a) introducing a first volume of a first liquid into a second volume of a second liquid above a first location on a first solid surface, the first liquid and the second liquid having a known first liquid-second liquid interfacial tension, the first liquid and the first location on the first solid surface having a known first liquid-first location interfacial tension, the second liquid and the first location on the first solid surface having a known second liquid-first location interfacial tension, wherein the first liquid-first location interfacial tension is greater than or equal to the sum of the first liquid-second liquid interfacial tension and the second liquid-first location interfacial tension, thereby giving rise to perfect liquid repellency between the first liquid and the first location on the first solid surface; and wherein the first volume of the first liquid contains a polymeric matrix.

8. A method of making a droplet of a first liquid exhibiting perfect liquid repellency in a second volume of a second liquid covering a first solid surface, comprising:

a) introducing a first volume of a first liquid into a second volume of a second liquid above a first location on a first solid surface, the first liquid and the second liquid having a known first liquid-second liquid interfacial tension, the first liquid and the first location on the first solid surface having a known first liquid-first location interfacial tension, the second liquid and the first location on the first solid surface having a known second liquid-first location interfacial tension, wherein the first liquid-first location interfacial tension is greater than or equal to the sum of the first liquid-second liquid interfacial tension and the second liquid-first location interfacial tension, thereby giving rise to perfect liquid repellency between the first liquid and the first location on the first solid surface; and further comprising forming a coating at an interface between the first volume of the first liquid and the second liquid.

9. A method of making a droplet of a first liquid exhibiting perfect liquid repellency in a second volume of a second liquid covering a first solid surface, comprising:

a) introducing a first volume of a first liquid into a second volume of a second liquid above a first location on a first solid surface, the first liquid and the second liquid having a known first liquid-second liquid interfacial tension, the first liquid and the first location on the first solid surface having a known first liquid-first location interfacial tension, the second liquid and the first location on the first solid surface having a known second liquid-first location interfacial tension, wherein the first liquid-first location interfacial tension is greater than or equal to the sum of the first liquid-second liquid interfacial tension and the second liquid-first location interfacial tension, thereby giving rise to perfect liquid repellency between the first liquid and the first location on the first solid surface; and further comprising performing a chemical reaction at an interface between the first volume of the first liquid and the second liquid.

10. A method of making a droplet of a first liquid exhibiting perfect liquid repellency in a second volume of a second liquid covering a first solid surface, comprising:

a) introducing a first volume of a first liquid into a second volume of a second liquid above a first location on a first solid surface, the first liquid and the second liquid having a known first liquid-second liquid interfacial tension, the first liquid and the first location on the first solid surface having a known first liquid-first location interfacial tension, the second liquid and the first location on the first solid surface having a known second liquid-first location interfacial tension, wherein the first liquid-first location interfacial tension is greater than or equal to the sum of the first liquid-second liquid interfacial tension and the second liquid-first location interfacial tension, thereby giving rise to perfect liquid repellency between the first liquid and the first location on the first solid surface; and further comprising performing a chemical reaction in the first volume of the first liquid.

11. A method of making a droplet of a first liquid exhibiting perfect liquid repellency in a second volume of a second liquid covering a first solid surface, comprising:

a) introducing a first volume of a first liquid into a second volume of a second liquid above a first location on a first solid surface, the first liquid and the second liquid having a known first liquid-second liquid interfacial tension, the first liquid and the first location on the first solid surface having a known first liquid-first location interfacial tension, the second liquid and the first location on the first solid surface having a known second liquid-first location interfacial tension, wherein the first liquid-first location interfacial tension is greater than or equal to the sum of the first liquid-second liquid interfacial tension and the second liquid-first location interfacial tension, thereby giving rise to perfect liquid repellency between the first liquid and the first location on the first solid surface; and further comprising, extracting at least a portion of the first volume of the first liquid from the second liquid.

* * * * *